US011334550B2

(12) United States Patent
Okamura

(10) Patent No.: US 11,334,550 B2
(45) Date of Patent: May 17, 2022

(54) CONTROLLER, CONTROL METHOD, AND CONTROL PROGRAM FOR SQL STATEMENT GENERATION IN A FACTORY AUTOMATION DATABASE

(71) Applicant: OMRON Corporation, Kyoto (JP)

(72) Inventor: Kotaro Okamura, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/643,548

(22) PCT Filed: Feb. 20, 2019

(86) PCT No.: PCT/JP2019/006297
§ 371 (c)(1),
(2) Date: Feb. 29, 2020

(87) PCT Pub. No.: WO2019/176487
PCT Pub. Date: Sep. 19, 2019

(65) Prior Publication Data
US 2020/0201836 A1    Jun. 25, 2020

(30) Foreign Application Priority Data
Mar. 15, 2018 (JP) .............................. JP2018-047635

(51) Int. Cl.
*G06F 16/22* (2019.01)
*G06F 16/21* (2019.01)

(52) U.S. Cl.
CPC ........ *G06F 16/2282* (2019.01); *G06F 16/212* (2019.01)

(58) Field of Classification Search
CPC .............................. G06F 16/2282; G06F 16/21
(Continued)

(56) References Cited

U.S. PATENT DOCUMENTS 5,812,840 A    9/1998  Shwartz
2003/0154191 A1*  8/2003  Fish .................... G06F 8/34
(Continued)

FOREIGN PATENT DOCUMENTS

JP    H10-003303 A    1/1998
JP    2016-194808 A    11/2016
(Continued)

OTHER PUBLICATIONS

English translation of the International Search Report("ISR") of PCT/JP2019/006297 dated May 14, 2019.
(Continued)

*Primary Examiner* — Cam Linh T Nguyen
(74) *Attorney, Agent, or Firm* — Metrolex IP Law Group, PLLC

(57) ABSTRACT

There has been desired a technique for creating a table on a database without formulating an SQL statement. A control program for a controller includes a generation module configured to output an SQL statement for creating, on a database, a table in which collection target variables included in the control program are stored. The generation module determines an identification name, on the database, of each collection target variable, identifies, based on a correspondence between a data type usable in the control program and a data type usable in the database, a data type on the database corresponding to the data type of the collection target variable in the control program, and generates the SQL statement based on the determined identification name and the identified data type.

11 Claims, 25 Drawing Sheets

(58) Field of Classification Search
USPC .......................................................... 707/741
See application file for complete search history.

(56) References Cited

U.S. PATENT DOCUMENTS

| | | | |
|---|---|---|---|
| 2008/0208364 A1* | 8/2008 | Grgic | G06F 9/5077 |
| | | | 700/2 |
| 2009/0055429 A1* | 2/2009 | Notarnicola | G06F 16/22 |
| 2010/0005124 A1* | 1/2010 | Wagner | G06F 16/27 |
| | | | 707/E17.005 |
| 2014/0163739 A1* | 6/2014 | Thomson | G05B 19/042 |
| | | | 700/275 |
| 2015/0254305 A1 | 9/2015 | Okamura et al. | |
| 2015/0363395 A1* | 12/2015 | Dembinski | G06F 16/211 |
| | | | 707/811 |
| 2016/0091890 A1 | 3/2016 | Fukatsu | |
| 2016/0098028 A1 | 4/2016 | Tanide | |
| 2016/0291564 A1 | 10/2016 | Okamura | |

FOREIGN PATENT DOCUMENTS

| | | |
|---|---|---|
| WO | 2013/191275 A1 | 12/2013 |
| WO | 2014/184962 A1 | 11/2014 |
| WO | 2015/162794 A1 | 10/2015 |

OTHER PUBLICATIONS

Written Opinion("WO") of PCT/JP2019/006297 dated May 14, 2019.

Extended European search report (EESR) dated Nov. 11, 2021 in a counterpart European patent application.

* cited by examiner

TABLE 1

| A'(*) | B'(*) | C' | α' | β' | γ' |
|---|---|---|---|---|---|
|  |  |  |  |  |  |

TABLE 1

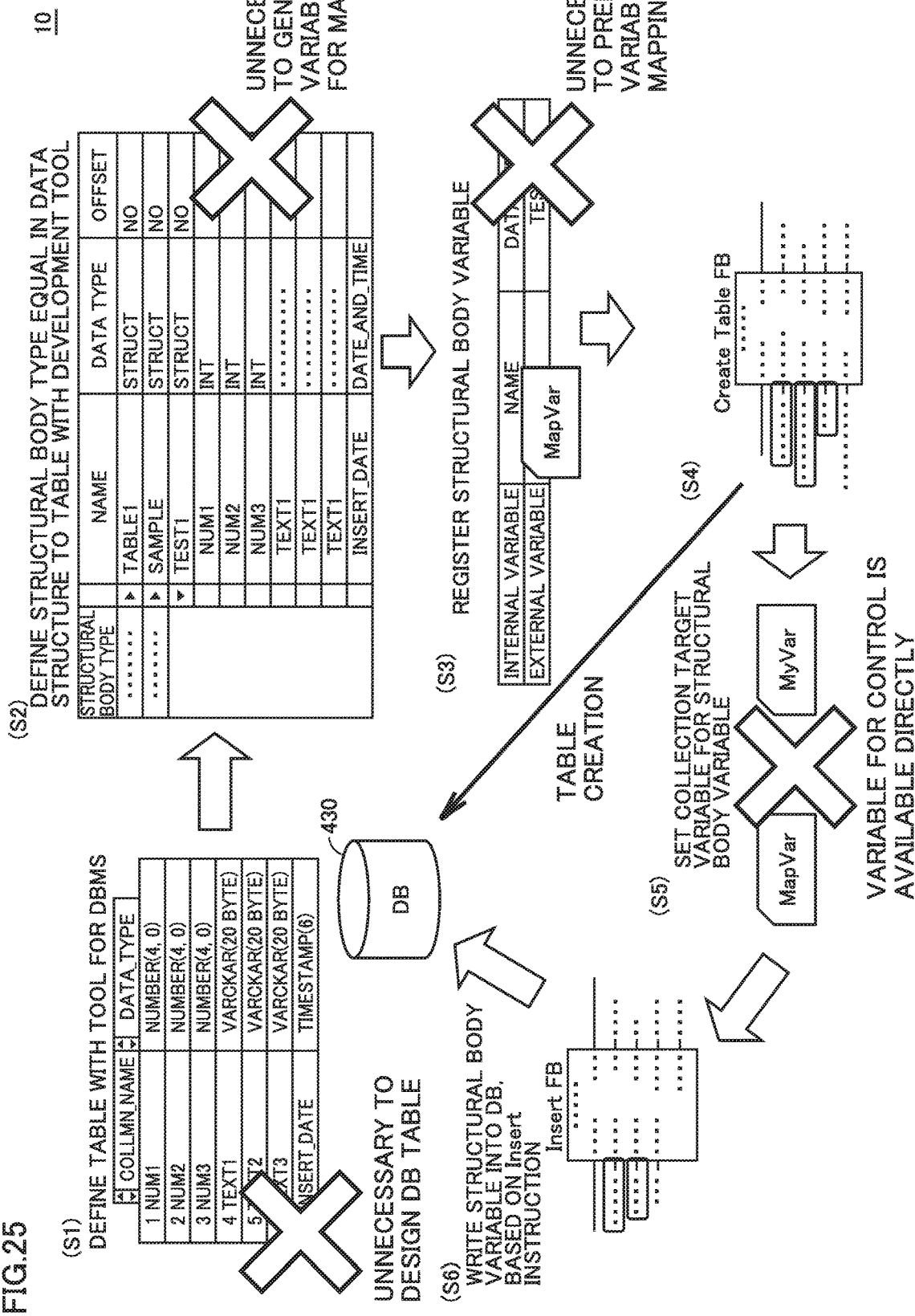

CONTROLLER, CONTROL METHOD, AND CONTROL PROGRAM FOR SQL STATEMENT GENERATION IN A FACTORY AUTOMATION DATABASE

TECHNICAL FIELD

The present disclosure relates to a technique for creating a table on a database to be accessed by a controller.

BACKGROUND ART

A factory automation (FA) system for automating production processes becomes widespread at various sites of production. The FA system includes various industrial drive apparatuses. Examples of the industrial drive apparatuses may include a movable table configured to move a workpiece, a conveyor configured to convey a workpiece, an arm robot configured to move a workpiece to a predetermined target place, and the like. These drive apparatuses are controlled by an industrial control device (hereinafter, also referred to as a "controller") such as a programmable logic controller (PLC) or a robot controller.

In recent years, a controller capable of accessing a database of an external apparatus becomes widespread. With regard to such a controller, Japanese Patent Laying-Open No. 2016-194808 (Patent Literature 1) discloses a controller capable of "collectively manipulating a plurality of records with a simple structure, in a technology for manipulating a database without having to formulate SQL statements". WO2014/184962 (Patent Literature 2) discloses a controller "capable of, when data is read from a database, reducing the number of reading steps from the database as compared to conventional techniques".

CITATION LIST

Patent Literature

PTL 1: Japanese Patent Laying-Open No. 2016-194808
PTL 2: WO2014/184962

SUMMARY OF INVENTION

Technical Problem

In order to upload, onto a database, collection target data in a controller, it is necessary to previously register a table on the database. The table is a model for data management. The table includes columns each indicating a column and records each indicating a row.

In order to create a table on a database, a user needs to previously define attributes of columns. For example, the user needs to define identification names (column names) of the respective columns, data types that may be added to the respective columns, and the like. As a preliminary preparation for adding collection target data items in a controller to the table, the user then needs to associate the collection target data items in the controller with the respective column names on the table or to convert the types of the collection target data items in accordance with the data types registered in the respective columns.

Such a preliminary setting requires expertise such as knowledge of SQL. It is therefore very difficult for a user poor in expertise to construct a database. Accordingly, there has been desired a technique capable of creating a table on a database without formulating an SQL statement.

Solution to Problem

An example of the present disclosure provides a controller for controlling a control target, the controller including: a communication unit configured to access a database; and a storage device configured to store a control program for controlling the control target. The control program includes a generation module configured to output an SQL statement for creating, on the database, a table in which collection target variables included in the control program are stored. The generation module determines an identification name, on the database, of each collection target variable. Based on a predetermined correspondence between a data type usable in the control program and a data type usable in the database, the generation module identifies a data type, on the database, of each collection target variable, the data type corresponding to the data type of the variable in the control program. The generation module generates the SQL statement, based on the determined identification name of each collection target variable and the identified data type of each collection target variable.

According to this disclosure, a user is able to create a table on a database without formulating an SQL statement.

In the example of the present disclosure, the controller further outputs a result of association among each collection target variable, a data type of the variable, an identification name of the variable on the database, and a data type of the variable on the database.

According to this disclosure, a user is able to easily grasp a correspondence among each collection target variable, a data type of each variable, an identification name of each variable on a database, and a data type of each variable on the database.

In the example of the present disclosure, the generation module determines a name identical to a variable name of each collection target variable or a name including a variable name of each collection target variable, as the identification name on the database.

According to this disclosure, variable names indicated as identification names on a database cause a user to easily grasp the identification names on the database, the identification names corresponding to the respective variables.

In the example of the present disclosure, when the collection target variables include a structural body, the generation module determines the identification name as a structural body name, determines the identification name of each member of the structural body, generates the SQL statement so as to register the determined identification name as the structural body name in the table, and generates the SQL statement so as to register the determined identification name of each member of the structural body, in a table different from the table in which collection target variables are stored.

According to this disclosure, a user is able to manage a member variable included in a structural body, as a table different from another collection target variable.

In the example of the present disclosure, the SQL statement includes an instruction statement for registering the determined identification name as the structural body name, as a foreign key in the table.

According to this disclosure, a user is able to register, as a foreign key, an identification name on a database, the identification name corresponding to a structural body, without formulating an SQL statement.

In the example of the present disclosure, the generation module is specified to accept input for designating any of the collection target variables as a primary key. The SQL statement includes an instruction statement for registering an identification name corresponding to a designated one of the variables as a primary key in the table.

According to this disclosure, a user is able to set a primary key without formulating an SQL statement.

Another example of the present disclosure provides a control method for a controller configured to access a database, the control method including: receiving a control program for the controller; determining an identification name, on the data base, of each collection target variable included in the control program; based on a predetermined correspondence between a data type usable in the control program and a data type usable in the database, identifying a data type, on the database, of each collection target variable, the data type corresponding to the data type of the variable in the control program; and outputting an SQL statement for creating, on the database, a table in which the collection target variables are stored, based on the determined identification name of each collection target variable and the identified data type of each collection target variable.

According to this disclosure, a user is able to create a table on a database without formulating an SQL statement.

Still another example of the present disclosure provides a control program for a controller configured to access a database, the control program causing the controller to execute: determining an identification name, on the database, of each collection target variable included in the control program; based on a predetermined correspondence between a data type usable in the control program and a data type usable in the database, identifying a data type, on the database, of each collection target variable, the data type corresponding to the data type of the variable in the control program; and outputting an SQL statement for creating, on the database, a table in which the collection target variables are stored, based on the determined identification name of each collection target variable and the identified data type of each collection target variable.

According to this disclosure, a user is able to create a table on a database without formulating an SQL statement.

Advantageous Effects of Invention

In an aspect, it is possible to create a table on a database without formulating an SQL statement.

BRIEF DESCRIPTION OF DRAWINGS

FIG. 25 is a diagram that illustrates a processing flow for table creation by the control system according to the second embodiment.

DESCRIPTION OF EMBODIMENTS

Embodiments of the present invention will be described below with reference to the drawings. In the following description, identical components and constituent elements are denoted with identical reference signs. Such components and constituent elements have the same names and functions. Therefore, the specific description of such components and constituent elements will not be given repeatedly.

First Embodiment

<A. Application Example>

Figure 1:
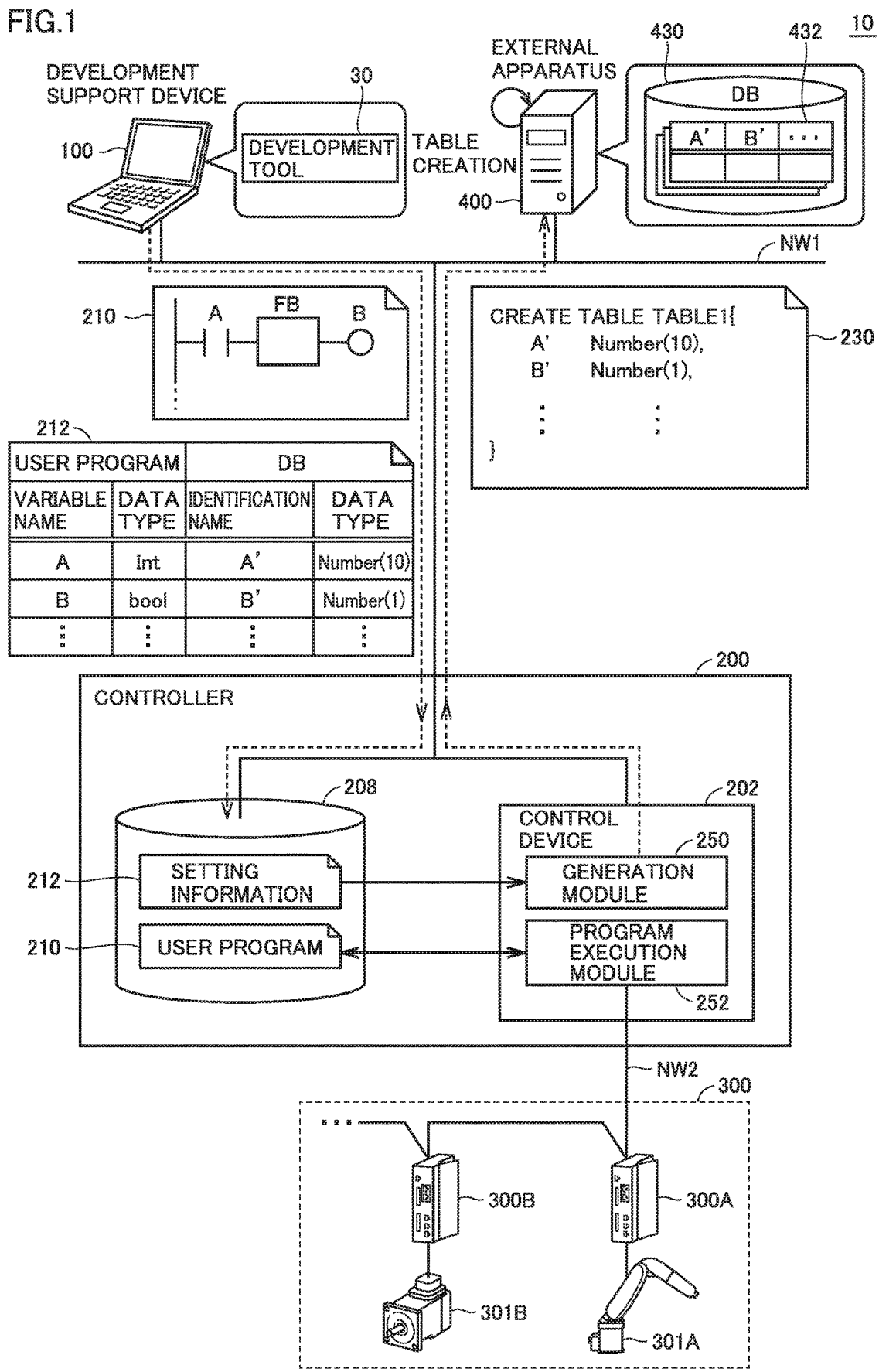
FIG. 1 is a diagram that illustrates an exemplary configuration of a control system according to a first embodiment.

With reference to FIG. 1, a description will be given of an application example of the present invention. FIG. 1 is a diagram that illustrates an exemplary configuration of a control system 10 according to a first embodiment.

Control system 10 is an FA system for automating production processes. In the example illustrated in FIG. 1, control system 10 includes one or more development support devices 100, one or more controllers 200, one or more drive apparatuses 300, and one or more external apparatuses 400.

Development support device 100, controller 200, and external apparatus 400 are connected to a network NW1. EtherNET (registered trademark). Object Linking and Embedding for Process Control Unified Architecture (OPC-UA), or the like is adopted as network NW1. OPC-UA is a communication standard established for achieving data exchange without depending on, for example, the type of a vendor or an operating system (OS).

Development support device 100 is, for example, a notebook or desktop personal computer (PC), a tablet terminal, a smartphone, or any information processing device capable of developing a control program for controller 200. External apparatus 400 is any database management system (DBMS) having a database function. External apparatus 400 is, for example, a notebook or desktop PC or a server.

Controller 200 and drive apparatus 300 are connected to a network NW2. Preferably, a field network is adopted as network NW2. The field network performs fixed-cycle communication that ensures data arrival time. EtherCAT (registered trademark), EtherNet/IP (registered trademark), CompoNet (registered trademark), and the like are known as such a field network that performs fixed-cycle communication.

Drive apparatus 300 includes various industrial apparatuses for automating production processes. For example, drive apparatus 300 includes a robot controller 300A, a servo driver 300B, an aim robot 301A to be controlled by robot controller 300A, a servo motor 301B to be controlled by servo driver 300B, and the like. In addition, drive apparatus 300 may include a visual sensor configured to capture an image of a workpiece, and other apparatuses for use in production processes.

A development tool 30 may be installed in development support device 100. Development tool 30 is an application for supporting development of a control program for controller 200. For example, development tool 30 is "Sysmac Studio" manufactured by OMRON Corporation. A user is able to design a control program for controller 200 on development tool 30 and to install the designed control program as a user program 210 in controller 200. User program 210 is sent to controller 200, as an executable file compiled by development support device 100.

Development tool 30 accepts a selecting manipulation for selecting collection target variables from variables included in user program 210. A "variable" is an identifier given to data to be handled in a source code of user program 210. Typically, a "variable" is data representing a state of controller 200 or drive apparatus 300. In other words, a "variable" is data having a value that changes in accordance with a state of each configuration in controller 200 or drive apparatus 300. The concept of a "variable" may include data representing a single value, data represented as an array, data represented as a structural body, and various kinds of data that may be specified in user program 210.

A variable selected as a collection target is collected during execution of user program 210, and is periodically uploaded onto a database 430 of external apparatus 400. In order to upload data onto database 430, it is necessary to previously register a table 432 on database 430. Table 432 is a model for data management. Table 432 is represented with columns each indicating a column and records each indicating a row. When data is set on each column, the data is uploaded onto table 432 on a record-by-record basis.

In the present embodiment, a designer is able to perform, on development tool 30, a manipulation for creating table 432. More specifically, development tool 30 is configured to accept a setting for designating collection target variables from among the variables included in user program 210. Development tool 30 is also configured to accept a setting for designating a data type on database 430, the data type corresponding to a data type of each collection target variable. Development tool 30 is also configured to accept a setting for designating an identification name of each collection target variable on database 430. These settings are made on, for example, a table setting screen 33 (see FIG. 4) to be described later. A specific description on table setting screen 33 will be given later.

In the example illustrated in FIG. 1, variables "A" and "B" included in user program 210 are designated as a collection target. Variable "A" is an "Int" type variable. Variable "B" is a "bool" type variable. In addition, a column name "A'" is designated as an identification name on database 430, the identification name corresponding to variable "A". A column name "W'" is designated as an identification name on database 430, the identification name corresponding to variable "B". In addition, "Number(10)" is designated as a data type on database 430, the data type corresponding to data type "Int" of variable "A". In addition, "Number(1)" is designated as a data type on database 430, the data type corresponding to data type "bool" of variable "B".

These correspondences are sent as setting information 212 to controller 200. Controller 200 includes a control device 202 and a storage device 208. Control device 202 includes a generation module 250 and a program execution module 252 as a functional configuration. Storage device 208 stores user program 210 and setting information 212 received from development support device 100.

Program execution module 252 starts to execute user program 210, based on acceptance of an instruction to start executing user program 210. Thereafter, program execution module 252 controls drive apparatus 300 in accordance with a control instruction specified in user program 210. Program execution module 252 sequentially updates values of the variables in accordance with an execution result of user program 210.

Generation module 250 outputs an SQL statement 230 for creating, on database 430, table 432 in which the collection target variables are stored, based on the identification name on database 430, the identification name being specified in setting information 212, and the data type on database 430, the data type corresponding to the identification name. In the example illustrated in FIG. 1, SQL statement 230 is specified to constitute table 432 including column "A'" of the "Number(10)" type and column "B'" of the "Number(1)" type.

SQL statement 230 thus generated is transferred to external apparatus 400, External apparatus 400 as a DBMS interprets SQL statement 230 received from controller 200, and creates table 432 on database 430 in accordance with SQL statement 230. In the example illustrated in FIG. 1, table 432 including columns "A'" and "B'" is created on database 430.

As described above, development support device 100 is configured to accept a setting for designating collection target variables, a setting for designating a data type on database 430, the data type corresponding to a data type of each collection target variable, and a setting for designating an identification name of each collection target variable on database 430. Controller 200 outputs SQL statement 230 for creating table 432 on database 430 to external apparatus 400, based on these settings. Table 432 is thus created on database 430 of external apparatus 400. As described above, the user does not need to formulate SQL statement 230 in creating table 432. It is therefore possible for even a user having no knowledge of SQL to easily construct database 430.

In the foregoing exemplary description, table 432 is created based on the variables included in user program 210. Alternatively, generation module 250 may create table 432, based on variables included in various control programs in controller 200, in place of the variables included in user program 210.

In the example illustrated in FIG. 1, user program 210 and setting information 212 are transferred as individual data items to controller 200. Alternatively, user program 210 and setting information 212 may be transferred as integrated data. In addition, setting information 212 and user program 210 may be transferred at the same timing or at different timings.

Also in the example illustrated in FIG. 1, database 430 is present in external apparatus 400. However, database 430 is not necessarily present in external apparatus 400. For example, database 430 may be present in controller 200. Alternatively, database 430 may be present in another unit connected to an internal bus in controller 200.

<B. Sequence Flow>

Figure 2:
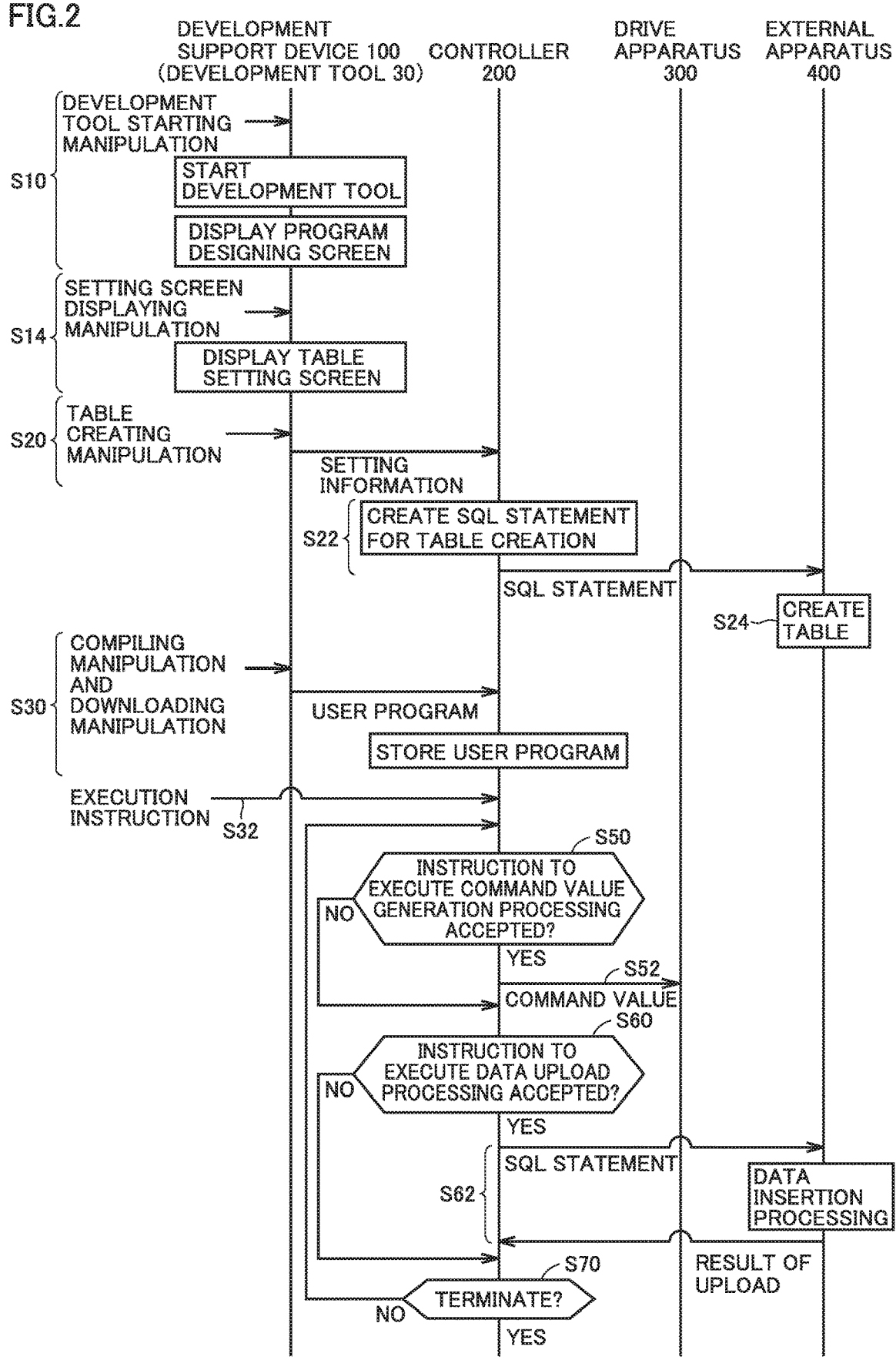
FIG. 2 is a sequence diagram that illustrates data flows among a development support device, a controller, a drive apparatus, and an external apparatus in the first embodiment.

With reference to FIGS. 2 to 6, a description will be given of a processing flow according to processing of creating table 432. FIG. 2 is a sequence diagram that illustrates data flows among development support device 100, controller 200, drive apparatus 300, and external apparatus 400.

Figure 3:
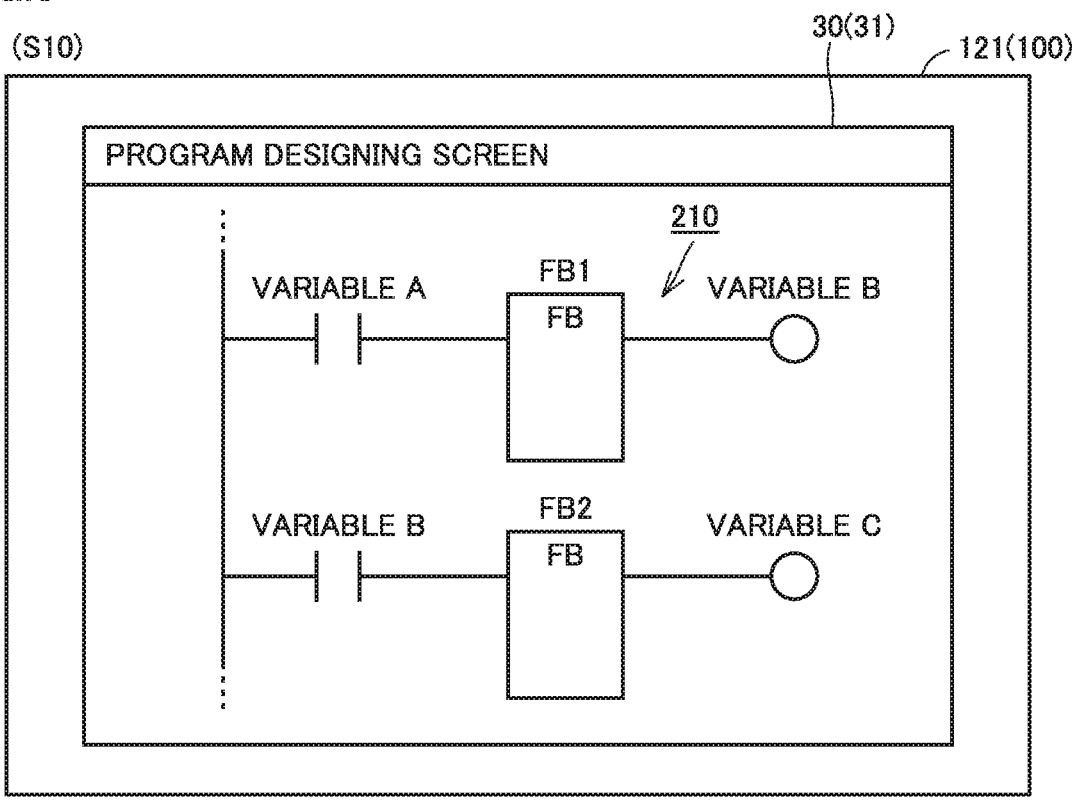
FIG. 3 is a diagram that illustrates a program designing screen as an exemplary user interface to be provided by a development tool according to the first embodiment.

It is assumed in step S10 that development support device 100 accepts an instruction to start development tool 30. Development support device 100 displays a program designing screen, based on this event. FIG. 3 is a diagram that illustrates a program designing screen 31 as an exemplary user interface to be provided by development tool 30. Program designing screen 31 is displayed on, for example, a display unit 121 of development support device 100.

User program 210 may be described with any programming language. For example, user program 210 may be specified with a ladder diagram (LD). Alternatively, user program 210 is specified with one of or a combination of an instruction list (IL), a structured text (ST), and a sequential function chart (SFC). User program 210 may also be specified with general-purpose programming language such as JavaScript (registered trademark) or C language.

In the example illustrated in FIG. 3, user program 210 is described with a ladder diagram. A designer is able to design user program 210 suitable for drive apparatus 300 as a control target, by combining any function blocks or specifying input and output relationships about variables and function blocks, on program designing screen 31. A function block is a component having a function to be repeatedly used in user program 210.

In the example illustrated in FIG. 3, user program 210 includes variables A to C, and function blocks FB1 and FB2. Function block FB1 executes a predetermined function specified in function block FB1, based on a value of variable A associated with an input unit of function block FB1. The execution result is reflected on variable B associated with an output unit of function block FA1. Function block FB2 executes a predetermined function specified in function block FB2, based on a value of variable B associated with an input unit of function block FB2. The execution result is reflected on variable C associated with an output unit of function block FB2. As described above, the designer is able to design any user program 210 by combining the variables and the function blocks on program designing screen 31.

With reference to FIG. 2 again, it is assumed in step S14 that development tool 30 accepts a manipulation to call a table setting screen regarding table creation. Development tool 30 displays the table setting screen, based on this event.

Figure 4:
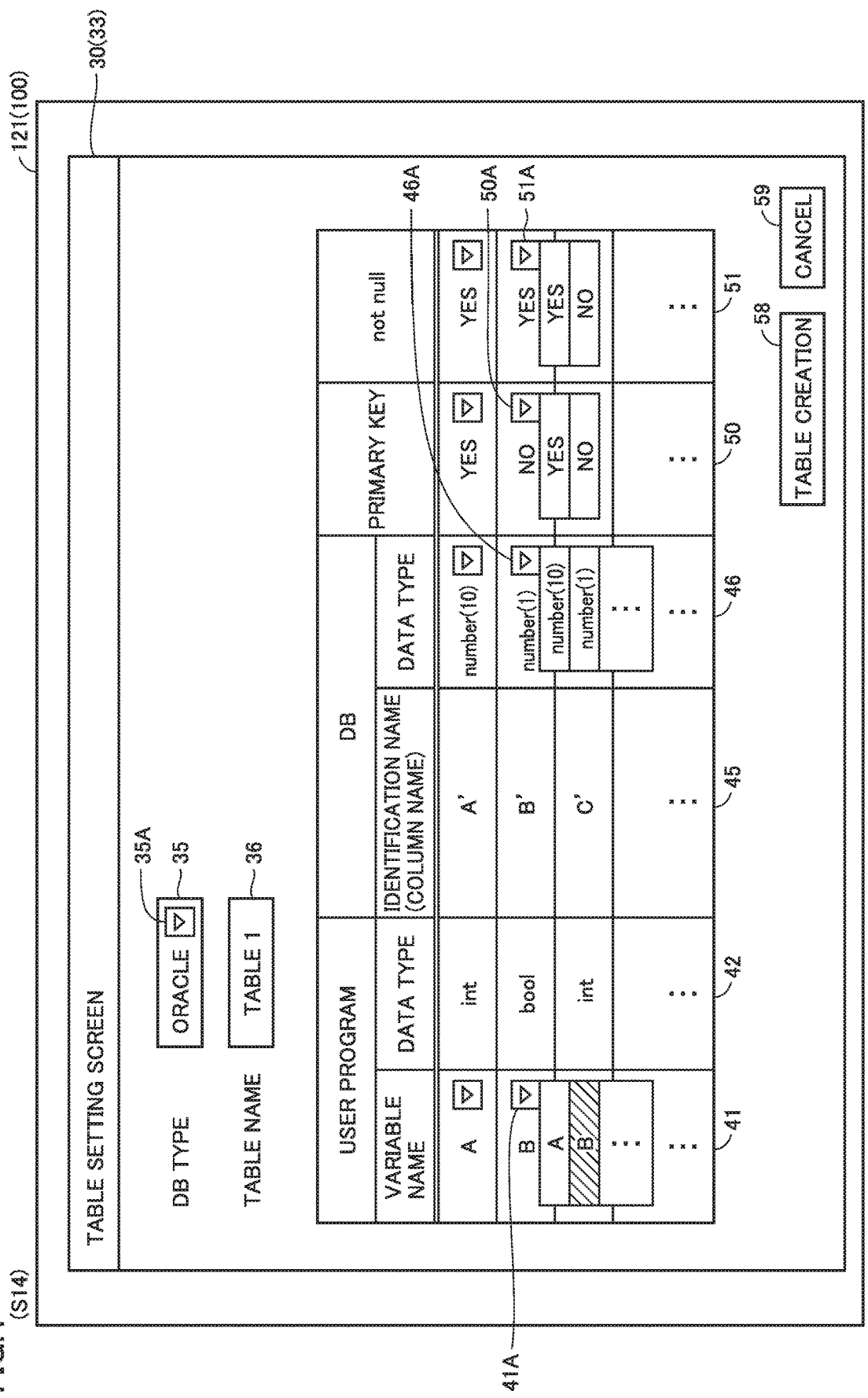
FIG. 4 is a diagram that illustrates a table setting screen as an exemplary user interface to be provided by the development tool according to the first embodiment.

FIG. 4 is a diagram that illustrates table setting screen 33 as an exemplary user interface to be provided by development tool 30. Table setting screen 33 accepts various settings for table creation.

More specifically, table setting screen 33 includes: a setting field 35 for information about connection to a database; a setting field 36 for a table name; a setting field 41 for designating a collection target variable; a display field 42 for displaying a data type of a collection target variable; a setting field 45 for designating an identification name of data on a database; a setting field 46 for designating a data type on a database; a setting field 50 for designating a primary key; and a setting field 51 for designating permission/inhibition of null designation.

Setting field 35 accepts designation of an information item about connection to a database. Connection information items are previously set by a user or the like. A connection name, a connection target database type, a connection destination address database name, a user name, a password, and the like are specified in each connection information item. When the user presses a button 35A, a list of the database types specified in the connection information items is displayed. Examples of the database types may include "Oracle Database", "SQL Server", "MySQL (registered trademark)", "Firebird", "DB2 (registered trademark)", "PostgreSQL", and the like. The user is able to designate an information item about connection to a database, by selecting a database type from the list of the database types.

Setting field 36 accepts input of a table name as to table 432 to be created. Setting field 36 is, for example, a text box in which a table name is set by input of characters. In the example illustrated in FIG. 4, "TABLE1" is set as a table name.

Setting field 41 accepts designation of a collection target variable. Typically, when the user presses a button 41A, a list of structural body names (variable names) defined in user program 210 is displayed. The list of the structural body names thus displayed may be previously registered by the user or may be automatically extracted from user program 210. The user is able to designate, as a collection target, a variable included in a structural body, by selecting a structural body name from the list of the structural body names.

Display field 42 displays a data type of each collection target variable set in setting field 41. For example, the data type corresponding to each variable is set when a variable is registered in program designing screen 31 (see FIG. 3), and a correspondence between a variable and a data type is stored at the time of this setting. Based on the collection target variable selected in setting field 41, development tool 30 identifies a data type corresponding to the selected variable, from the correspondence between the variable and the data type, and displays the data type and the variable side by side.

Setting field 45 accepts a setting for designating an identification name on database 430 as to each collection target variable set in setting field 41. The identification name set in setting field 45 is used as a column name of a table. Setting field 45 is, for example, a text box, and the user is able to set a column name corresponding to each variable by inputting characters to the text box.

Preferably, a column name of a table is determined automatically. For example, the column name is determined to be the same as a variable name. Alternatively, a variable name to which a predetermined keyword is added is determined as the column name. In the case where the column name is set automatically, the user does not need to set the column name in setting field 45.

Setting field 46 accepts a setting for designating a data type on database 430 as to each variable set in setting field 41. For example, when the user presses a button 46A, a list of settable data types is displayed. The user is able to designate a data type on database 430 by selecting a data type from the list of the data types.

Preferably, a data type on database 430 is determined automatically. More specifically, a correspondence between a data type that may be utilized in user program 210 and a data type on database 430 is specified previously. Based on the correspondence, development tool 30 identifies a data type on database 430, the data type corresponding to a data type of each collection target variable, and displays the data type on setting field 46. In this case, the user does not need to set a data type in setting field 46.

Setting field 50 accepts a setting for designating a variable regarded as a primary key on table 432. A primary key is used for uniquely identifying a record in table 432. As to a variable set as a primary key, duplication of data is inhibited. As an exemplary aspect of setting a primary key, "YES" and "NO" are displayed when the user presses a button 50A. A column in which "YES" is selected is set as a primary key. A column in which "NO" is selected is not set as a primary key.

Setting field 51 accepts a setting as to whether to permit input of NULL to each column. As an exemplary aspect of setting, "YES" and "NO" are displayed when the user presses a button 51A. As to a column in which "YES" is selected, input of NULL is inhibited. As to a column in which "NO" is selected, input of NULL is permitted.

In a case where a table creation button 58 is pressed, development support device 100 transfers a table setting made on table setting screen 33 as setting information 212 to controller 200. In a case where a cancel button 59 on table setting screen 33 is pressed, development support device 100 closes table setting screen 33 without transferring the table setting set in table setting screen 33.

With reference to FIG. 2 again, it is assumed in step S20 that table creation button 58 is pressed. Based on this event, development support device 100 transfers the table setting made on table setting screen 33 as setting information 212 to controller 200.

In step S22, generation module 250 of controller 200 generates an SQL statement 230 (see FIG. 1) for table creation, based on reception of setting information 212 from development support device 100. In step S22, SQL statement 230 is generated by controller 200. Alternatively, SQL statement 230 may be generated by development tool 30.

Figure 5:
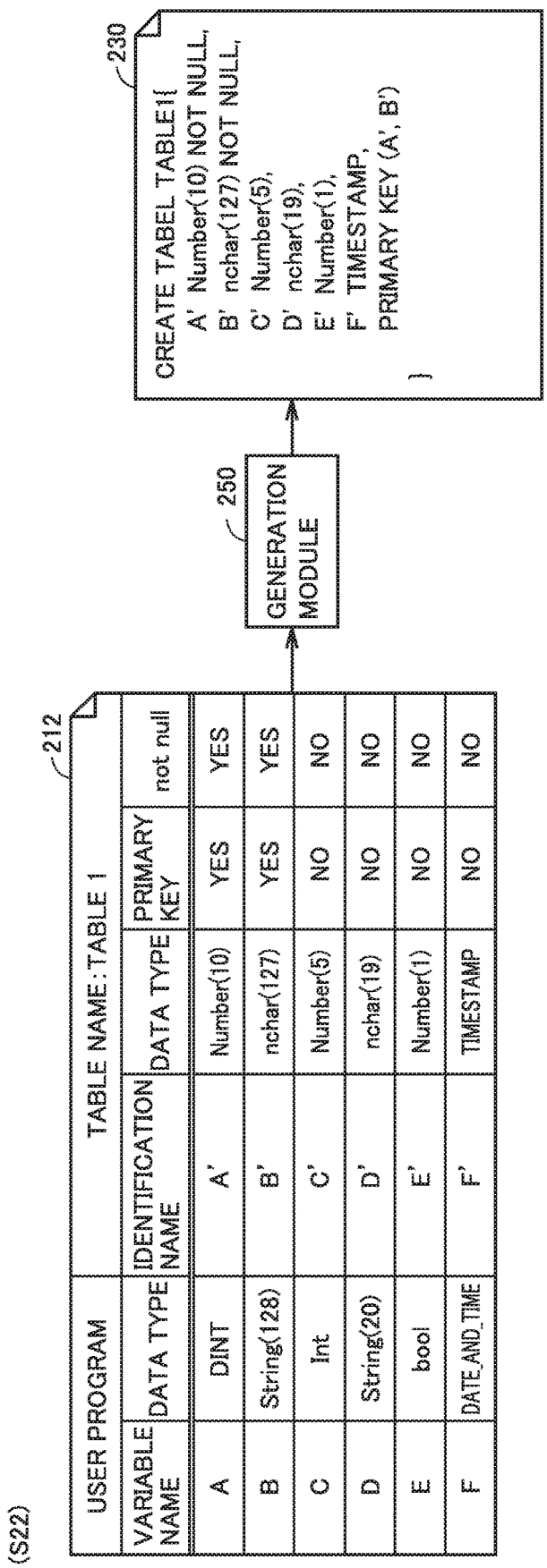
FIG. 5 is a diagram that schematically illustrates processing of generating an SQL statement in the first embodiment.

With reference to FIG. 5, a description will be given of processing of generating SQL statement 230 by generation module 250. FIG. 5 is a diagram that schematically illustrates the processing of generating SQL statement 230.

As illustrated in FIG. 5, generation module 250 generates SQL statement 230, based on input of setting information 212. More specifically, generation module 250 references to table name "TABLE1" included in setting information 212, and reflects a description of "Create Table TABLE1" on SQL statement 230. With this description, a table name of table 432 to be created is set as "TABLE1".

Next, generation module 250 reflects a description of "A' Number(10)" on SQL statement 230, based on an identification name "A'" included in setting information 212 and a data type "Number(10)" associated with identification name "A'". With this description, the column with identification name "A'" is added to table 432. As to identification name "A'", since NULL designation is inhibited, a description of "NOT NULL" is reflected on SQL statement 230. Likewise, generation module 250 reflects, on SQL statement 230, descriptions for addition of the columns with identification names "B'" to "F'".

Next, since setting information 212 specifies that the columns with identification names "A'" and "B'" are set as a primary key, generation module 250 adds a description of "PRIMARY KEY (A', B')" to SQL statement 230. With this description, the columns with identification names "A'" and "B'" are set as a primary key.

SQL statement 230 thus generated is transmitted to external apparatus 400. With reference to FIG. 2 again, in step S24, external apparatus 400 creates table 432 in accordance with SQL statement 230 received from controller 200.

Figure 6:
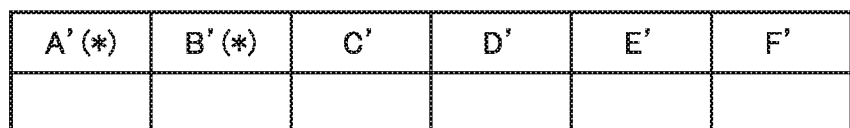
FIG. 6 is a diagram that illustrates a data structure of a table created in accordance with the SQL statement illustrated in FIG. 5.

FIG. 6 is a diagram that illustrates a data structure of table 432 created in accordance with SQL statement 230 illustrated in FIG. 5. As illustrated in FIG. 6, table 432 includes columns with identification names "A'" to "F'". An asterisk "*" denotes a primary key. In the example illustrated in FIG. 6, columns "A'" and "B'" are indicated as a primary key.

With reference to FIG. 2 again, it is assumed in step S30 that development tool 30 accepts a compiling manipulation. Based on this event, development tool 30 compiles user program 210 designed on program designing screen 31. It is assumed thereafter that development tool 30 accepts a manipulation to download a result of the compilation. Based on this event, development tool 30 transfers compiled user program 210 to controller 200. Controller 200 stores received user program 210 in storage device 208 (see FIG. 1).

It is assumed in step S32 that controller 200 accepts an instruction to execute user program 210. Based on this event, controller 200 starts to execute user program 210. In a case where user program 210 is a cyclically executable program, controller 200 repeatedly executes a group of instructions included in user program 210 at every predetermined control cycle. More specifically, controller 200 executes the first to last lines of user program 210 in one control cycle. In a subsequent control cycle, controller 200 executes the first to last lines of user program 210 again. Controller 200 generates a command value at every control cycle, and outputs the command value to drive apparatus 300.

In step S50, controller 200 determines whether to accept an instruction to execute command value generation processing specified in user program 210. When controller 200 determines that controller 200 accepts this execution instruction (YES in step S50), controller 200 generates a command value in accordance with the specified instruction, and sends the command value to drive apparatus 300 (step S52). Drive apparatus 300 drives a control target in accordance with the command value received from controller 200. When controller 200 does not determine that controller 200 accepts the instruction to execute the command value generation processing (NO in step S50), controller 200 switches the control to step S60 without executing the processing in step S52.

In step S60, controller 200 determines whether to accept an instruction to execute collection target variable upload processing. When controller 200 determines that controller 200 accepts this execution instruction (YES in step S60), controller 200 generates an SQL statement for executing an INSERT instruction. The SQL statement specifies information (e.g., a table name) for designating a table to which data is added, a value of data to be uploaded onto each column, and the like.

In step S62, controller 200 sends the generated SQL statement to external apparatus 400. External apparatus 400 generates a record in which a value of a variable is reflected on each column in accordance with the SQL statement received from controller 200, and adds the generated record to table 432 generated in step S24. The collection target variable is thus reflected on table 432. Thereafter, external apparatus 400 transmits, to controller 200, a result of the upload indicating normal termination or abnormal termination.

When controller 200 does not accept the instruction to execute the collection target variable upload processing (NO in step S60), controller 200 switches the processing to step S70 without executing the processing in step S62.

In step S70, controller 200 determines whether to terminate the execution of user program 210. This termination instruction is issued based on, for example, acceptance of a terminating manipulation from the user. When controller 200 determines that controller 200 accepts the terminating manipulation from the user (YES in step S70), controller 200 terminates the execution of user program 210. When controller 200 does not accept the terminating manipulation from the user (NO in step S70), controller 200 returns the control to step S50.

In the foregoing exemplary description, controller 200 transmits the SQL statement including the INSERT instruction to database 430 of external apparatus 400 in step S62. Alternatively, only the value to be subjected to INSERT processing may be sent to database 430 of external apparatus 400. In this case, external apparatus 400 generates the SQL statement including the INSERT instruction, based on reception of the value to be subjected to INSERT processing, and executes the INSERT processing for the received value, based on the SQL statement.

<C. Creating Pattern by Generation Module 250>

Collection target variables may include a structural body. In a case where collection target variables include a structural body, generation module 250 generates an SQL statement 230 for table creation in a manner different from that in a case where collection target variables include no structural body. For example, two creating patterns (creating patterns 1 and 2) are considered as processing of creating a table 432 in the case where collection target variables include a structural body.

In creating pattern 1, generation module 250 separately creates a table for managing a variable different from a structural body and a table for managing a member variable included in a structural body. In creating pattern 2, generation module 250 creates one table for collectively managing a variable different from a structural body and a member variable included in a structural body.

With reference to FIGS. 7 to 10, hereinafter, a description will be given of creating patterns 1 and 2 according to the first embodiment in sequence.

(C1. Table Creating Pattern 1)

Figure 7:
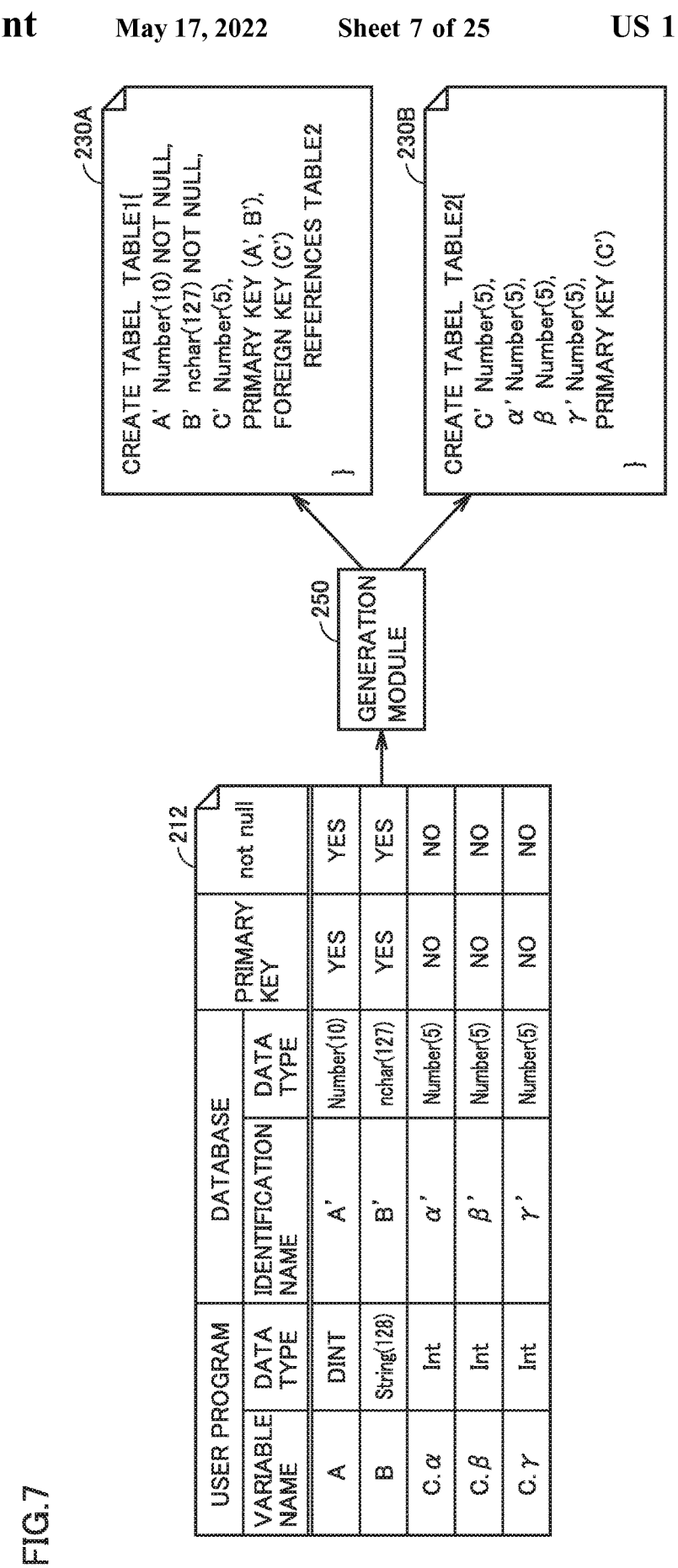
FIG. 7 is a diagram that schematically illustrates a table creating pattern 1 according to the first embodiment.

First, a description will be given of table creating pattern 1 according to the first embodiment. FIG. 7 is a diagram that schematically illustrates table creating pattern 1 according to the first embodiment.

In a case where collection target variables include a structural body, development tool 30 (see FIG. 4) accepts designation of a data type on database 430 and designation of an identification name on database 430, as to each member included in the structural body in addition to a variable different from the structural body.

For example, it is assumed that a structural body "C" is designated as a collection target in table setting screen 33 (see FIG. 4). In a case where structural body "C" includes member variables "α", "β", and "γ", the user accepts designation of a data type on database 430 and designation of an identification name (a column name) on database 430 as to member variables "α", "β", and "γ". For example, it is assumed that a column "α'" of a data type "Number(5)" is set for member variable "α", a column "β'" of data type "Number(5)" is set for member variable "β", and a column "γ'" of data type "Number(5)" is set for member variable "γ". As a result of these settings, setting information 212 illustrated in FIG. 7 is generated.

In this creation example, as illustrated in FIG. 7, generation module 250 of controller 200 generates an SQL statement so as to register a determined identification name of each member of the structural body in another table, based on the input of setting information 212. In the example illustrated in FIG. 7, generation module 250 generates an SQL statement 230A for creating "TABLE1" and an SQL statement 230B for creating "TABLE2", based on the input of setting information 212.

More specifically, generation module 250 reflects a description of "A' Number(10)" on SQL statement 230A, based on identification name "A'" included in setting information 212 and data type "Number(10)" associated with identification name "A'". With this description, the column with identification name "A'" is added to the table. As to identification name "A'", since NULL designation is inhibited, a description of "NOT NULL" is reflected on SQL statement 230A. Likewise, generation module 250 reflects, on SQL statement 230A, a description for addition of the column with identification name "B'".

As to structural body "C", generation module 250 newly generates a column name "C'" corresponding to a structural body name. Column name "C'" may be equal to or different from the structural body name. Thereafter, generation module 250 reflects a description of "C' Number(5)" on SQL statement 230A. The column with identification name "C'" is thus added to the table.

In addition, generation module 250 adds, to SQL statement 230A, an instruction code for registering a column name of a structural body as a foreign key in a table. In the example illustrated in FIG. 7, a description of "FOREIGN KEY (C') REFERENCES TABLE2" is added to SQL statement 230A. With this description, column "C'" is specified as a foreign key for referencing to "TABLE2".

As to member variables "α", "β", and "γ" included in structural body "C", next, generation module 250 reflects descriptions for addition of columns "C'", "α'", "β'", and "γ'" on SQL statement 230B different from SQL statement 230A. In the example illustrated in FIG. 7, a description of "C' Number(5)", a description of "α' Number(5)", a description of "β' Number(5)", and a description of "γ' Number(5)" are reflected on SQL statement 230B. With these descriptions, the columns with identification names "C'", "α'", "β'", and "γ'" are added to the different table. As to column name "C'" given to structural body name "C", a description of "PRIMARY KEY (C')" is added to SQL statement 230B. With this description, the column with identification name "C'" is set as a primary key.

Figure 8:
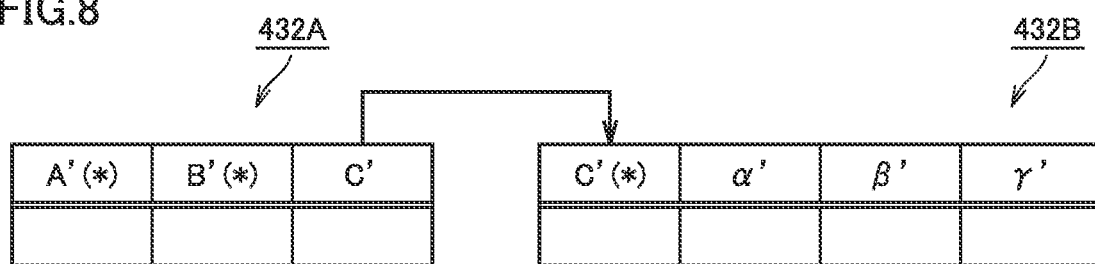
FIG. 8 is a diagram that illustrates a data structure of a table created in accordance with an SQL statement illustrated in FIG. 7.

FIG. 8 is a diagram that illustrates a data structure of a table 432A created in accordance with SQL statement 230A illustrated in FIG. 7 and a data structure of a table 432B created in accordance with SQL statement 230B illustrated in FIG. 7.

Table 432A includes the columns with identification names "A'", "B'", and "C'". An asterisk "*" denotes a primary key. In the example illustrated in FIG. 8, columns "A'" and "B'" are indicated as a primary key. In addition, column "C'" references to external "TABLE2".

Table 432B includes the columns with identification names "C'", "α'", "Θ'", and "γ'". An asterisk "*" denotes a primary key. In the example illustrated in FIG. 8, column "C'" is indicated as a primary key.

As described above, in this creation example, generation module 250 separately creates table 432A for managing a variable different from a structural body and table 432B for managing a member variable included in a structural body.

In the foregoing exemplary description, as illustrated in FIGS. 7 and 8, the collection target variables include one structural body. Alternatively, in a case where collection target variables include a plurality of structural bodies, an SQL statement is generated such that tables are created in accordance with the number of structural bodies. In a case where members of a structural body include a structural body, an SQL statement is generated such that a table is created for each structural body.

Also in the foregoing exemplary description, as illustrated in FIGS. 7 and 8, in the case where collection target variables include a structural body, the name of the structural body is registered as a foreign key of table 432A and a primary key of table 432B. Alternatively, the name of the structural body is not necessarily registered as the foreign key of table 432A and the primary key of table 432B. For example, one or more members of the structural body may be registered as the foreign key of table 432A and the primary key of table 432B. For example, a member "C.α" of structural body "C" is registered as the foreign key of table 432A, and is also registered as the primary key of table 432B. In this case, structural body "C" itself is not necessarily registered as the columns of tables 432A and 432B.

(C2. Table Creating Pattern 2)

Figure 9:
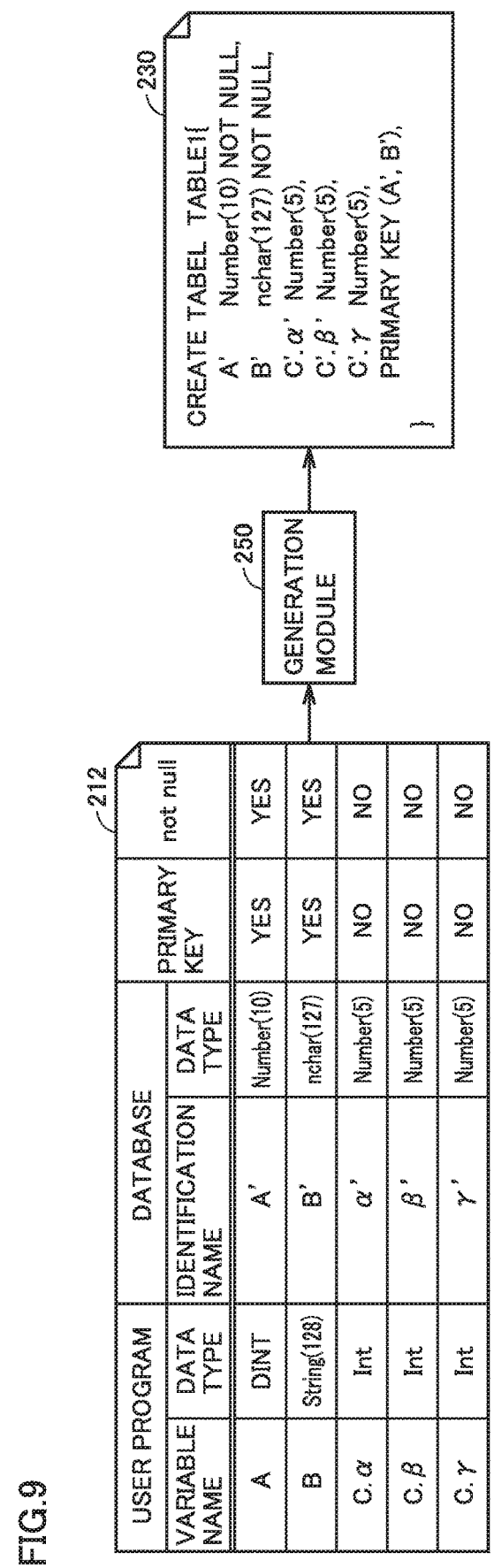
FIG. 9 is a diagram that schematically illustrates a table creating pattern 2 according to the first embodiment.
Figure 10:
FIG. 10 is a diagram that illustrates a data structure of a table created from an SQL statement illustrated in FIG. 9.

With reference to FIGS. 9 and 10, next, a description will be given of creating pattern 2 of table 432 in a case where collection target variables include a structural body.

FIG. 9 is a diagram that schematically illustrates table creating pattern 2 according to the first embodiment. As illustrated in FIG. 9, generation module 250 of controller 200 generates SQL statement 230, based on input of setting information 212.

It is assumed that setting information 212 specifies structural body "C" as a collection target variable. Structural body "C" includes variables "α", "β", and "γ" as a member variable. In this creation example, generation module 250 creates one table 432 for collectively managing a variable different from a structural body and a member variable included in a structural body.

More specifically, generation module 250 reflects the description of "A' Number(10)" on SQL statement 230, based on identification name "A'" included in setting information 212 and data type "Number(10)" associated with identification name "A". With this description, the column with identification name "A'" is added to table 432. As to identification name "A'", since NULL designation is inhibited, a description of "NOT NULL" is reflected on SQL statement 230. Likewise, generation module 250 reflects, on SQL statement 230, the description for addition of the column with identification name "B'". As to member variables "α", "β", and "γ" of structural body "C", similar to variables "A" and "B", generation module 250 reflects descriptions for addition of the columns with identification names "α'", "β'", and "γ'" on SQL statement 230.

FIG. 10 is a diagram that illustrates a data structure of table 432 created from SQL statement 230 illustrated in FIG. 9.

Table 432 includes the columns with identification names "A'", "B'", "C'", "α'", "β'", and "γ'". An asterisk "*" denotes a primary key. In the example illustrated in FIG. 10, columns "A'" and "B'" are indicated as a primary key.

As described above, in this creation example, generation module 250 creates one table 432 for collectively managing a variable different from a structural body and a member variable included in a structural body.

<D. Hardware Configuration>

Figure 11:
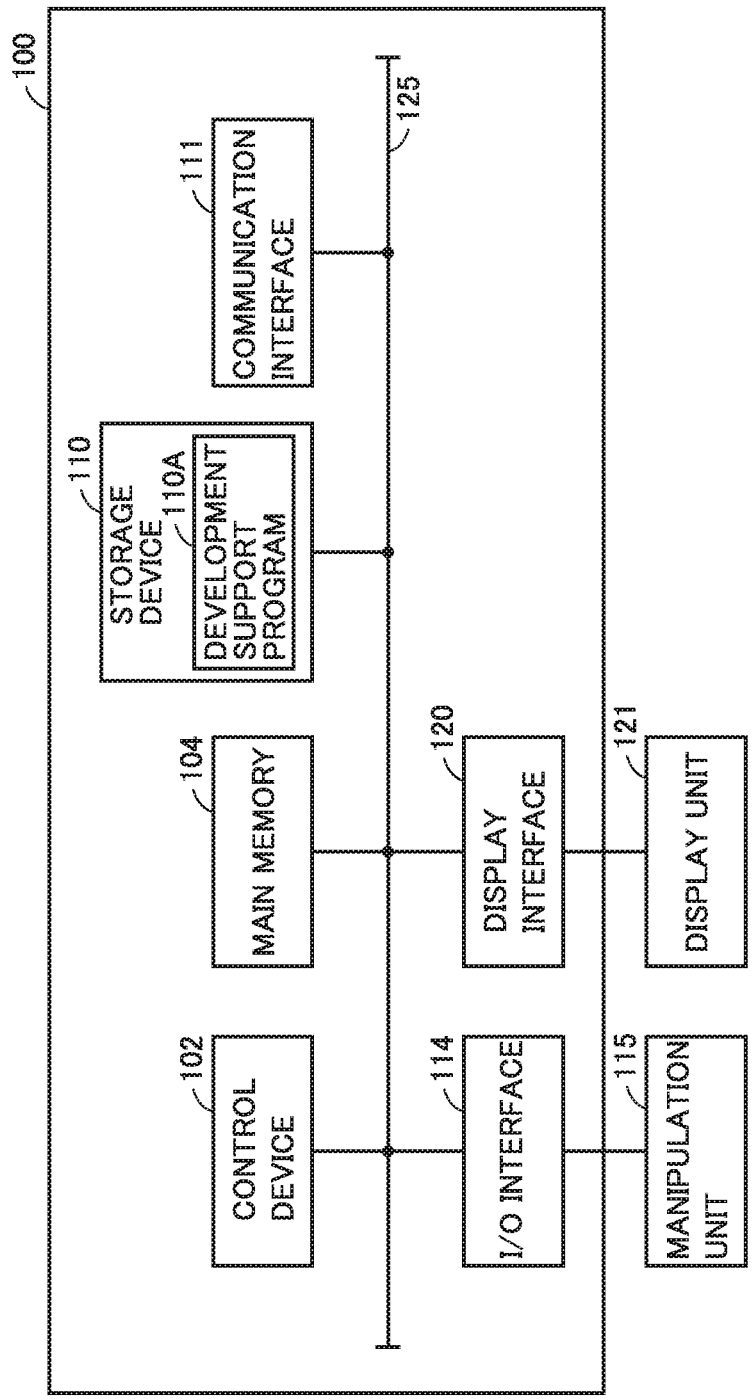
FIG. 11 is a schematic diagram that illustrates a hardware configuration of the development support device according to the first embodiment.
Figure 12:
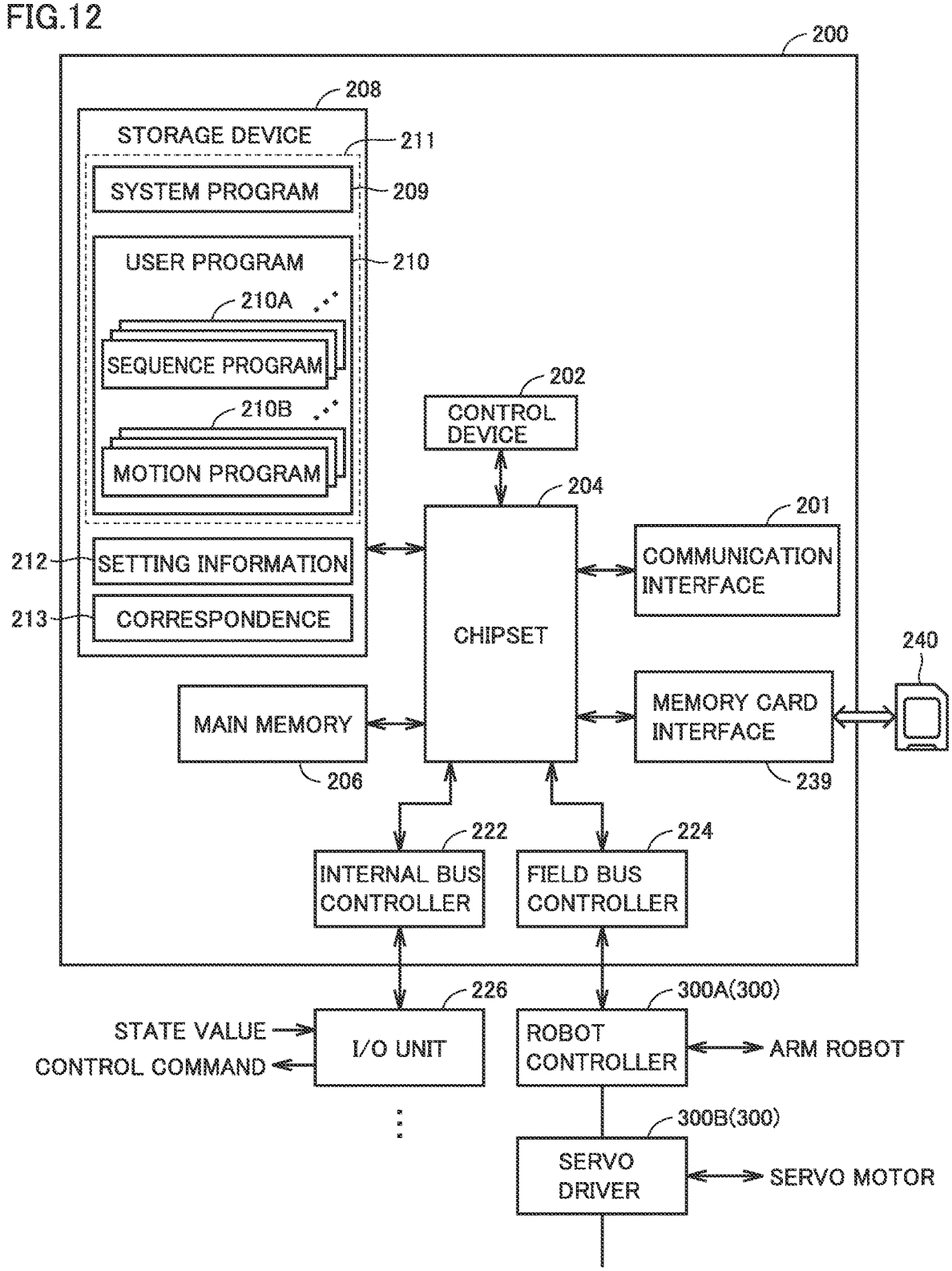
FIG. 12 is a schematic diagram that illustrates an exemplary hardware configuration of the controller according to the first embodiment.
Figure 13:
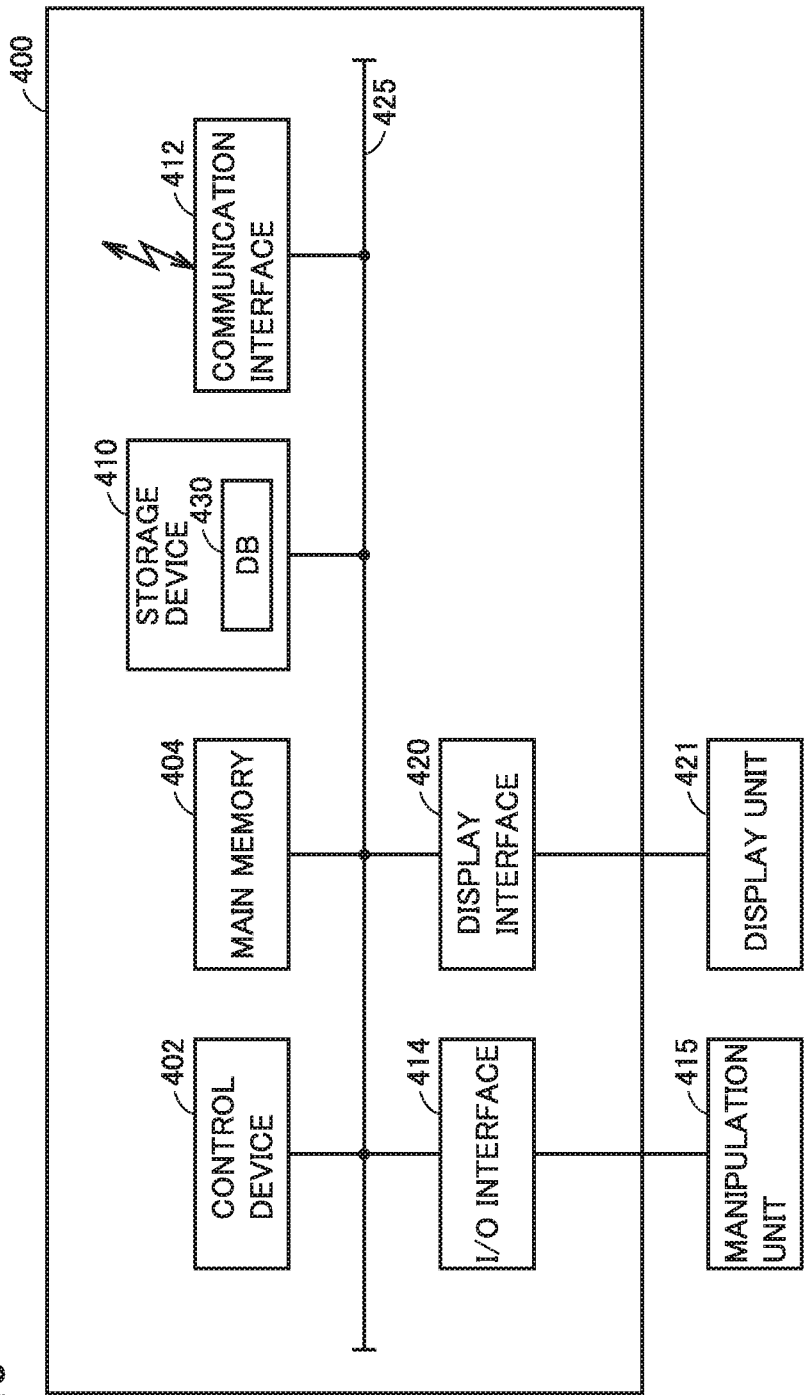
FIG. 13 is a block diagram that illustrates a hardware configuration of the external apparatus according to the first embodiment.

With reference to FIGS. 11 to 13, a description will be given of a hardware configuration of development support device 100, a hardware configuration of controller 200, and a hardware configuration of external apparatus 400 in sequence.

(D1. Hardware Configuration of Development Support Device 100)

With reference to FIG. 11, first, a description will be given of the hardware configuration of development support device 100. FIG. 11 is a schematic diagram that illustrates the hardware configuration of development support device 100.

Development support device 100 includes, for example, a computer constructed in accordance with a general-purpose computer architecture. Development support device 100 includes a control device 102 such as a central processing unit (CPU) or a micro-processing unit (MPU), a main memory 104, a nonvolatile storage device 110, a communication interface 111, an input/output (I/O) interface 114, and a display interface 120. These components are connected via an internal bus 125 so as to communicate with one another.

Control device 102 expands a development support program 110A stored in storage device 110 onto main memory 104 and executes development support program 110A, thereby implementing various kinds of processing in development tool 30. Development support program 110A is a program for providing an environment for developing user program 210. Storage device 110 stores various data items generated by development tool 30, and the like in addition to development support program 110A. Examples of the data items may include user program 210 designed on development tool 30, setting information 212, and the like.

Communication interface 111 exchanges data with another communication apparatus via a network. Examples of the other communication apparatus may include controller 200, external apparatus 400, the server, and the like. Development support device 100 may be configured to download various programs such as development support program 110A from the other communication apparatus through communication interface 111.

I/O interface 114 is connected to a manipulation unit 115 to receive a signal indicating a user manipulation through manipulation unit 115. Manipulation unit 115 typically includes a keyboard, a mouse, a touch panel, a touch pad, or the like, and accepts a manipulation from the user.

Display interface 120 is connected to display unit 121 to send an image signal for displaying an image to display unit 121 in accordance with a command from control device 102 or the like. Display unit 121 includes a liquid crystal display (LCD), an organic electro luminescence (EL) display, or the like, and displays various kinds of information for the user. Display unit 121 may display various screens (e.g., program designing screen 31, table setting screen 33) to be provided by development tool 30. In the example illustrated in FIG. 11, development support device 100 is separated from display unit 121. Alternatively, development support device 100 may be integrated with display unit 121.

(D2. Hardware Configuration of Controller 200)

With reference to FIG. 12, next, a description will be given of the hardware configuration of controller 200. FIG. 12 is a schematic diagram that illustrates an exemplary hardware configuration of controller 200.

Controller 200 includes a communication interface 201, a control device 202 such as a CPU or an MPU, a chipset 204, a main memory 206, a nonvolatile storage device 208, an internal bus controller 222, a field bus controller 224, and a memory card interface 239.

Control device 202 reads control program 211 stored in storage device 208, expands control program 211 onto main memory 206, and executes control program 211, thereby implementing any control for robot controller 300A, servo driver 300B, or the like. Control program 211 includes various programs for controlling controller 200. For example, control program 211 includes a system program 209, user program 210, and the like. System program 209 includes instruction codes for providing basic functions of controller 200, such as processing of inputting/outputting data, and control of execution timing. User program 210 is downloaded from development support device 100. User program 210 is optionally designed in accordance with a control target, and includes a sequence program 210A for executing sequence control and a motion program 210B for executing motion control.

Chipset 204 controls each component to achieve processing as a whole of controller 200.

Storage device 208 stores various kinds of data in addition to control program 211. For example, storage device 208 stores setting information 212, data type correspondences 213, and the like. A specific description on data type correspondences 213 will be given in "Second Embodiment" later.

Internal bus controller 222 is an interface that exchanges data with various devices each coupled to controller 200 via an internal bus. As an example of such a device, an I/O unit 226 is connected to internal bus controller 222.

Field bus controller 224 is an interface that exchanges data with various drive apparatuses 300 each coupled to controller 200 via a field bus. As an example of such a device, robot controller 300A or servo driver 300B is connected to field bus controller 224. In addition, a drive apparatus such as a visual sensor may be connected to field bus controller 224.

Each of internal bus controller 222 and field bus controller 224 is capable of giving any command to a device connected thereto, and is capable of acquiring any data managed by the device. In addition, internal bus controller 222 and/or field bus controller 224 may function as an interface for exchanging data with robot controller 300A or servo driver 300B.

Communication interface 201 (communication unit) controls data exchanges via various wired/wireless networks. Controller 200 communicates with development support device 100 and external apparatus 400 through communication interface 201. In addition, controller 200 is capable of accessing database 430 on external apparatus 400 through communication interface 201.

Memory card interface 239 is configured to allow attachment and detachment of a memory card 240 (e.g., an SD card) that is an example of an external storage medium. Memory card interface 239 allows data mite into memory card 240 and data read from memory card 240.

(D3. Hardware Configuration of External Apparatus 400)

With reference to FIG. 13, next, a description will be given of the hardware configuration of external apparatus 400. FIG. 13 is a block diagram that illustrates the hardware configuration of external apparatus 400.

The hardware configuration of external apparatus 400 has a general-purpose architecture. In other words, external apparatus 400 is implemented as a kind of personal computer. However, external apparatus 400 may be implemented using special hardware rather than general-purpose hardware.

More specifically, external apparatus 400 includes a control device 402 such as a CPU or an MPU, a main memory 404, a nonvolatile storage device 410, a communication interface 412, an I/O interface 414, and a display interface 420. These components are connected via an internal bus 425 so as to establish data communications with one another.

Control device 402 reads a control program (not illustrated) stored in storage device 410, expands the control program onto main memory 404, and executes the control program, thereby controlling external apparatus 400. In other words, control device 402 cooperates with main memory 404 and storage device 410 to implement a control unit configured to execute control arithmetic processing.

Communication interface 412 and I/O interface 414 relay data exchanges between external apparatus 400 and another communication apparatus.

More specifically, communication interface 412 relays communication with controller 200 via network NW1 (see FIG. 1) or the like. For example, a component that enables communication based on EtherNET may be adopted as communication interface 412.

I/O interface 414 is connected to a manipulation unit 415 to receive a signal indicating a user manipulation through manipulation unit 415. Manipulation unit 415 typically includes a keyboard, a mouse, a touch panel, a touch pad, or the like, and accepts a manipulation from the user.

Display interface 420 is connected to display unit 421 to send an image signal for displaying an image to display unit 421 in accordance with a command from control device 402 or the like. Display unit 421 includes an LCD, an organic EL display, or the like, and displays various kinds of information for the user. In the example illustrated in FIG. 13, external apparatus 400 is separated from display unit 421. Alternatively, external apparatus 400 may be integrated with display unit 421.

<E. Summary of First Embodiment>

As described above, development support device 100 according to the present embodiment is configured to accept a setting for designating collection target variables, a setting for designating a data type on database 430, the data type corresponding to a data type of each collection target variable, and a setting for designating an identification name of each collection target variable on database 430. Development support device 100 transfers these settings as setting information 212 to controller 200.

Controller 200 outputs, to external apparatus 400, SQL statement 230 for creating table 432 on database 430, based on the identification name on database 430, the identification name being specified in setting information 212 received from development support device 100, and the data type on database 430, the data type corresponding to the identification name. Table 432 is thus automatically created on database 430 of external apparatus 400.

As described above, the user is able to create table 432 on database 430 by designating a collection target variable and a data type on database 430, the data type corresponding to the data type of each variable. The user therefore does not need to formulate SQL statement 230 in creating table 432. It is accordingly possible for even a user having no knowledge of SQL to easily construct database 430.

<F. Supplementary Note>

As described above, the present embodiment involves the following disclosure.

[Configuration 1]

A control system including:

a controller (200) configured to access a database (430); and a development support device (100) configured to communicate with the controller (200), wherein a development tool (30) configured to support development of a control program for the controller (200) is installable in the development support device (100), the development tool (30) is configured to accept, as setting information (212), a setting for designating collection target variables from among variables included in the control program, and a setting for designating an identification name, on the database (430), of each collection target variable, and the controller (200) or the development tool (30) includes a generation module (250) configured to output an SQL statement for creating, on the database (430), a table (432) in which the collection target variables are stored, based on an identification name on the database (430), the identification name being specified in the setting information (212) received from the development support device (100), and a data type on the database (430), the data type corresponding to the identification name.

[Configuration 2]

The control system according to Configuration 1, wherein the development tool (30) is configured to display a data type of each collection target variable, based on an event that the collection target variable is set.

[Configuration 3]

The control system according to Configuration 1 or 2, wherein the development tool (30) is configured to further accept a setting for designating a primary key from among the designated collection target variables.

[Configuration 4]

The control system according to any one of Configurations 1 to 3, wherein, when the designated collection target variables include a structural body, the development tool (30) is configured to accept designation of an identification name, on the database (430), of each member included in the structural body.

[Configuration 5] The control system according to Configuration 4, wherein the generation module (250) generates the SQL statement so as to register the identification name determined for each member in the structural body, in a table different from the table (432) in which the collection target variables are stored.

[Configuration 6]

The control system according to Configuration 5, wherein the generation module (250) adds, to the SQL statement, an instruction code for registering the identification name of the structural body as a foreign key in the table (432).

[Configuration 7]

A controller (200) configured to access a database (430) and configured to communicate with a development support device (100) configured to support development of a control program, a development tool (30) configured to support development of the control program being installable in the development support device (100), the development tool (30) being configured to accept, as setting information (212), a setting for designating collection target variables from among variables included in the control program, and a setting for designating an identification name, on the database (430), of each of the collection target variables, the controller (200) including:

a communication unit configured to receive the setting information (212) and the control program from the development support device (100);

a program execution module configured to control a drive apparatus as a control target in accordance with the control program received from the development support device (100); and a generation module (250) configured to output an SQL statement for creating, on the database (430), a table (432) in which the collection target variables are stored, based on an identification name on the database (430), the identification name being specified in the setting information (212) received from the development support device (100), and a data type on the database (430), the data type corresponding to the identification name.

[Configuration 8]

A control method for a controller (200) configured to access a database (430) and configured to communicate with a development support device (100) configured to support development of a control program, a development tool (30) configured to support development of the control program being installable in the development support device (100), the development tool (30) being configured to accept, as setting information (212), a setting for designating collection target variables from among variables included in the control program, and a setting for designating an identification name, on the database (430), of each of the collection target variables, the control method including:

receiving the setting information (212) and the control program from the development support device (100);

controlling a drive apparatus as a control target in accordance with the control program received from the development support device (100); and outputting an SQL statement for creating, on the database (430), a table (432) in which the collection target variables are stored, based on an identification name on the database (430), the identification name being specified in the setting information (212) received from the development support device (100), and a data type on the database (430), the data type corresponding to the identification name.

Second Embodiment

<G. Outline>

In the first embodiment, a user makes a setting for creating a table 432 in table setting screen 33 to generate an SQL statement 230 for table creation in accordance with this setting. In contrast to this, in a second embodiment, a function of generating an SQL statement 230 is provided as a function module to be incorporated in user program 210.

In other words, a user is able to utilize a combination of this function module with another function module, on program designing screen 31 (see FIG. 3).

Other respects, such as a hardware configuration, of a control system 10 according to the second embodiment are equal to those of control system 10 according to the first embodiment; therefore, the repeated description thereof will not be given below.

<H. Application Example>

Figure 14:
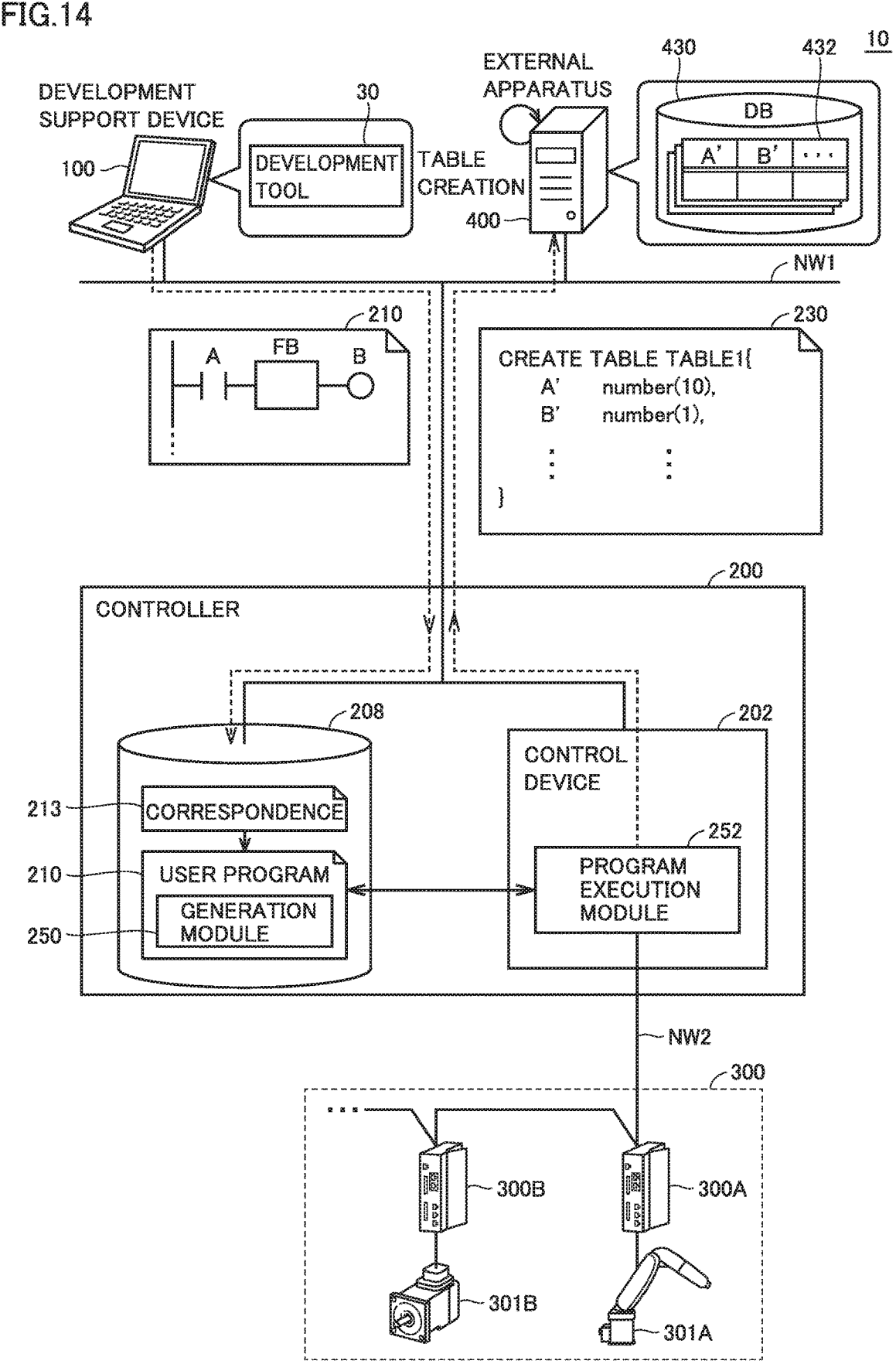
FIG. 14 is a diagram that illustrates an exemplary configuration of a control system according to a second embodiment.
Figure 15:
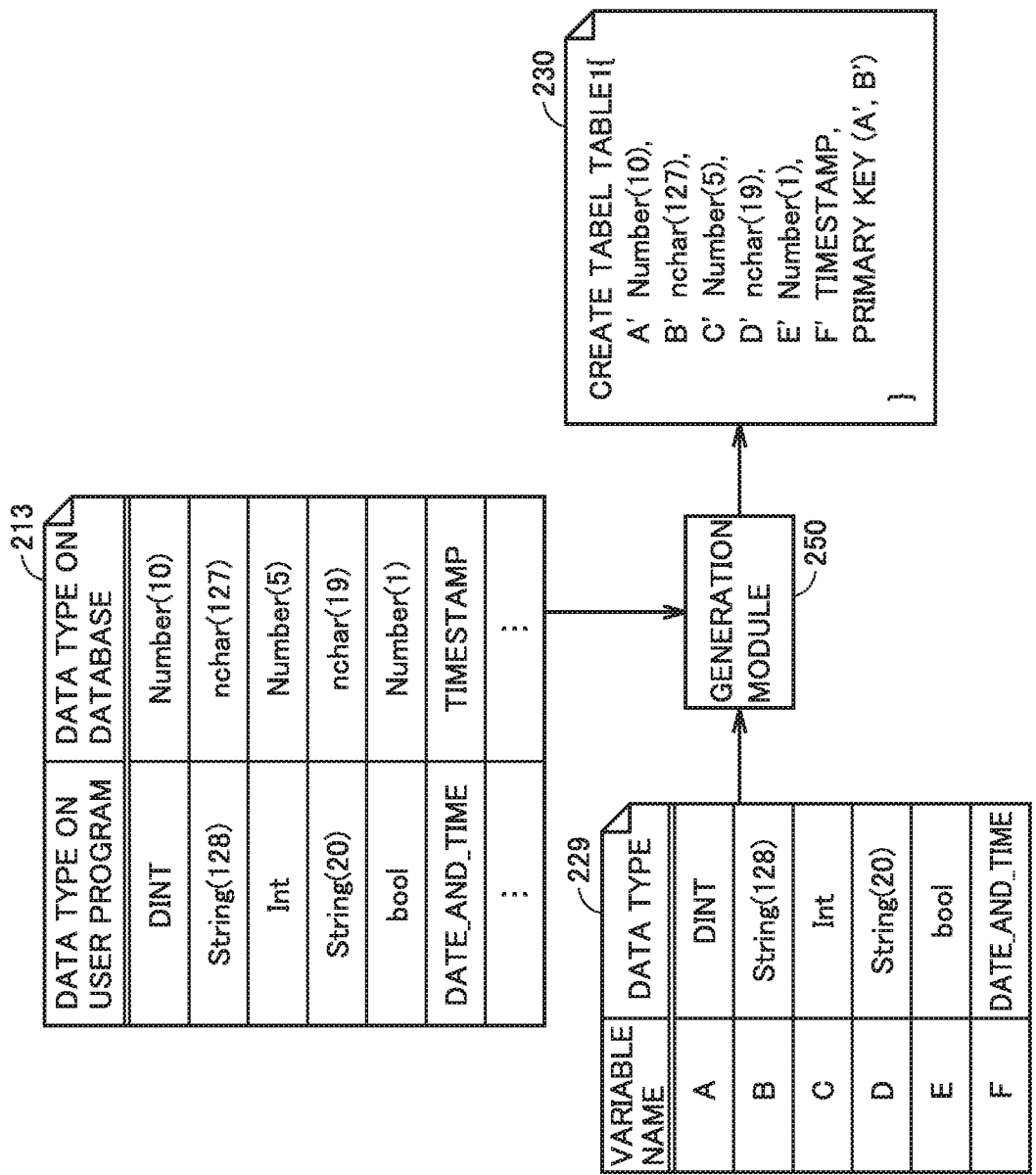
FIG. 15 is a diagram that schematically illustrates processing of generating an SQL statement by a generation module according to the second embodiment.

With reference to FIGS. 14 and 15, a description will be given of another application example of the present invention. FIG. 14 is a diagram that illustrates an exemplary configuration of control system 10 according to the second embodiment.

As illustrated in FIG. 14, control system 10 includes one or more development support devices 100, one or more controllers 200, one or more drive apparatuses 300, and one or more external apparatuses 400. Controller 200 includes a control device 202 and a storage device 208 as a hardware configuration. Control device 202 includes a program execution module 252 as a functional configuration.

Development support device 100 according to the present embodiment has a function of generating an SQL statement 230 in the form of a function module such as a function block. In the example illustrated in FIG. 14, a generation module 250 corresponds to the function module. A user is able to utilize a combination of generation module 250 with another function module, on a program designing screen 31 (see FIG. 3).

Based on acceptance of a downloading manipulation, development support device 100 transfers, to controller 200, a user program 210 in which generation module 250 is incorporated. Controller 200 stores user program 210 received from development support device 100 in storage device 208.

Program execution module 252 starts to execute user program 210, based on acceptance of an instruction to start executing user program 210. Based on arrival of the timing of executing generation module 250, program execution module 252 executes the function of generating an SQL statement 230 by generation module 250.

With reference to FIG. 15, a description will be given of the function of generating SQL statement 230 by generation module 250. FIG. 15 is a diagram that schematically illustrates processing of generating SQL statement 230 by generation module 250.

Generation module 250 generates SQL, statement 230, based on input of correspondences 213 stored in storage device 208 and collection target variables 229.

Correspondences 213 each specify a correspondence between a data type that may be utilized in user program 210 and a data type that may be utilized in a database 430. Correspondences 213 may be specified previously or may be optionally edited by a user. Typically, correspondences 213 are downloaded from a server as required.

Collection target variables 229 are designated as a collection target on user program 210 designed in program designing screen 31 (see FIG. 3). In the example illustrated in FIG. 15, variables "A" to "F" are designated as a collection target.

Generation module 250 determines an identification name of each collection target variable on database 430. In an aspect, generation module 250 determines an identification name that is equal to a variable name. In another aspect, generation module 250 determines, as an identification name, a variable name to which a predetermined keyword is added. For example, generation module 250 determines that identification names of variables "A" to "F" on database 430 are column names "A'" to "F'". It should be noted that the method of determining a column name is not limited to those described above, and any method may be adopted as the method of determining a column name.

Based on correspondences 213, next, generation module 250 identifies a data type of each collection target variable on database 430, the data type corresponding to the data type of the variable. As a result, a "Number(10)" type is identified as the corresponding data type of "DINT" type variable "A". A "nchar(127)" type is identified as the corresponding data type of "String (128)" type variable "B". A "Number(5)" type is identified as the corresponding data type of "Int" type variable "C". A "nchar(19)" type is identified as the corresponding data type of "String (20)" type variable "D". A "Number(1)" type is identified as the corresponding data type of "bool" type variable "E", A "TIMESTAMP" type is identified as the corresponding data type of "DATE_AND_TIME" type variable "F".

Next, generation module 250 generates SQL statement 230, based on the determined identification name of each collection target variable and the identified data type of each collection target variable on database 430. More specifically, generation module 250 reflects a description of "A' Number (10)" on SQL statement 230, based on identified identification name "A'" of variable "A" and identified data type "Number(10)" of variable "A" on database 430. With this description, the column with identification name "A'" is added to table 432. Likewise, generation module 250 reflects, on SQL statement 230, descriptions for addition of the columns with identification names "B'" to "F'".

SQL statement 230 thus generated is transferred to external apparatus 400. External apparatus 400 as a DBMS interprets SQL statement 230 received from controller 200, and creates table 432 on database 430 in accordance with SQL statement 230.

SQL statement 230 for table creation is automatically generated as described above. The user is able to create table 432 including collection target variables as an element, only by preparing user program 210 with the collection target variables as input to generation module 250. In this way, the user is able to create table 432 on database 430 without formulating an SQL statement.

In the foregoing exemplary description, table 432 is created based on the variables included in user program 210. Alternatively, table 432 may be created based on variables included in various control programs in controller 200, in place of user program 210.

Also in the example illustrated in FIG. 14, database 430 is present in external apparatus 400. However, database 430 is not necessarily present in external apparatus 400. For example, database 430 may be present in controller 200. Alternatively, database 430 may be present in another unit connected to an internal bus in controller 200.

As to correspondences 213 illustrated in FIG. 15, a data type on user program 210 is associated with a data type on database 430 in one-to-one correspondence. In a case of multiple kinds of databases 430, alternatively, a data type on user program 210 may be associated with data types on respective databases 430 in one-to-N (≥2) correspondence.

<I. Sequence Flow>

Figure 16:
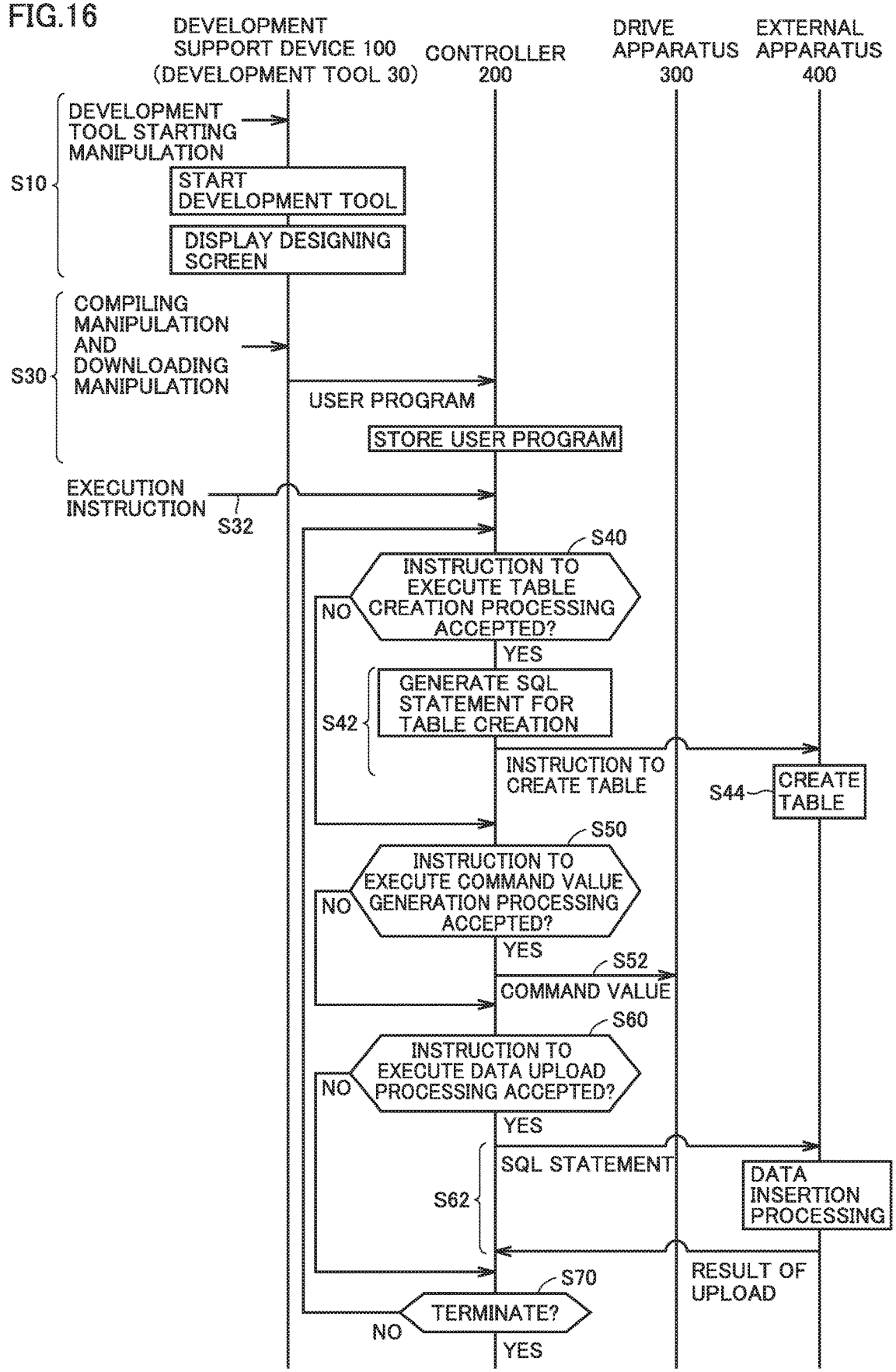
FIG. 16 is a sequence diagram that illustrates data flows among a development support device, a controller, a drive apparatus, and an external apparatus in the second embodiment.
Figure 17:
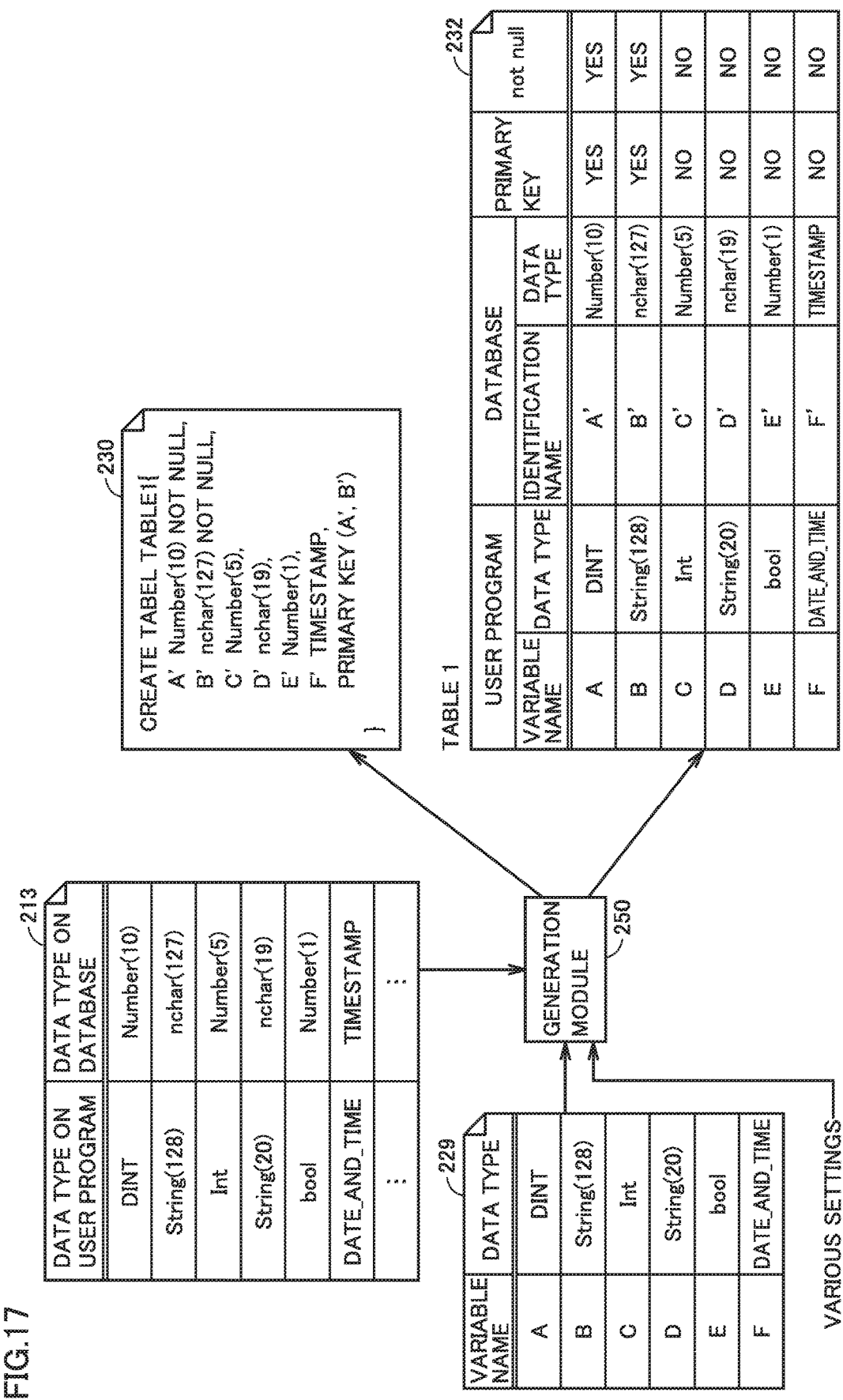
FIG. 17 is a diagram that schematically illustrates processing of generating an SQL statement in the second embodiment.

With reference to FIGS. 16 and 17, a description will be given of a processing flow according to processing of creating table 432. FIG. 16 is a sequence diagram that illustrates data flows among development support device 100, controller 200, drive apparatus 300, and external apparatus 400 in the second embodiment.

It is assumed in step S10 that development support device 100 accepts an instruction to start development tool 30. Development support device 100 displays program designing screen 31 (see FIG. 3), based on this event. Program designing screen 31 is equal to that described above with reference to FIG. 3; therefore, the repeated description thereof will not be given below. A designer is able to incorporate generation module 250 for table creation into user program 210 on program designing screen 31.

It is assumed in step S30 that development tool 30 accepts a compiling manipulation. Based on this event, development tool 30 compiles user program 210 designed on program designing screen 31. It is assumed thereafter that development tool 30 accepts a manipulation to download a result of the compilation. Based on this event, development tool 30 transfers compiled user program 210 to controller 200. Controller 200 stores received user program 210 in storage device 208 (see FIG. 14).

It is assumed in step S32 that controller 200 accepts an instruction to execute user program 210. Based on this event, controller 200 starts to execute user program 210. In a case where user program 210 is a cyclically executable program, controller 200 repeatedly executes a group of instructions included in user program 210 at every predetermined control cycle. More specifically, controller 200 executes the first to last lines of user program 210 in one control cycle. In a subsequent control cycle, controller 200 executes the first to last lines of user program 210 again. Controller 200 generates a command value at every control cycle, and outputs the command value to drive apparatus 300.

In step S40, controller 200 determines whether to accept an instruction to execute table creation processing. When generation module 250 specified in user program 210 is executed, controller 200 determines that controller 200 accepts the instruction to execute the table creation processing. When controller 200 determines that generation module 250 is executed (YES in step S40), controller 200 switches the control to step S42. When generation module 250 is not executed (NO in step S40), controller 200 switches the control to step S50.

In step S42, generation module 250 of controller 200 generates an SQL statement 230 for table creation. In step S42, SQL statement 230 is generated by controller 200, Alternatively, SQL statement 230 may be generated by development tool 30. FIG. 17 is a diagram that schematically illustrates the processing of generating SQL statement 230 in the second embodiment.

As illustrated in FIG. 17, generation module 250 of controller 200 generates SQL statement 230, based on input of correspondences 213 (see FIG. 15), collection target variables 229 (see FIG. 15), and other various settings.

More specifically, generation module 250 determines an identification name of each collection target variable on database 430. It is assumed that, for example, generation module 250 determines that identification names of variables "A" to "F" on database 430 are column names "A'" to "F'". In an aspect, generation module 250 determines, as an identification name on database 430, a name identical to a variable name of each collection target variable. In this case, column names "A'" to "F'" are respectively equal to variable names "A" to "F". In another aspect, generation module 250 determines, as the identification name on database 430, a name including a variable name of each collection target variable. In this case, variable names "A" to "F" to which predetermined keywords are respectively added respectively correspond to column names "A'" to "F'". The variable names indicated as the identification names on database 430 cause the user to easily grasp the columns relevant to the respective variables.

Based on correspondences 213, next, generation module 250 identifies a relevant data type of each collection target variable on database 430.

Next, generation module 250 generates SQL statement 230, based on the determined identification name of each collection target variable and the identified data type of each collection target variable on database 430. More specifically, generation module 250 reflects a description of "A' Number (10)" on SQL statement 230, based on identified identification name "A'" of variable "A" and identified data type "Number(10)" of variable "A" on database 430. With this description, the column with identification name "A'" is added to table 432. Likewise, generation module 250 reflects, on SQL statement 230, descriptions for addition of the columns with identification names "B'" to "F'".

In addition, generation module 250 reflects, on SQL statement 230, various settings input thereto. Examples of the various settings may include a setting of a table name to be given to a created table, a setting of a column to be designated as a primary key, and a setting as to whether to permit input of NULL to each column.

It is assumed that, for example, "TABLE1" is designated as a table name. In this case, generation module 250 reflects as a description of "Create Table TABLE1" on SQL statement 230. With this description, a table name of table 432 to be created is set as "TABLE1".

It is also assumed that variables "A" and "B" are set as a primary key. In this case, generation module 250 adds a description of "PRIMARY KEY (A', B')" to SQL statement 230. With this description, column "A'" corresponding to variable "A" and column "B'" corresponding to variable "B" are set as a primary key. As described above, SQL statement 230 includes an instruction statement for registering the identification name on the database, the identification name corresponding to the designated variable, as a primary key in the table.

It is also assumed that NULL inhibition is set for variables "A" and "B". In this case, generation module 250 adds a description of "NOT NULL" for columns "A'" and "B'". NULL designation is thus inhibited for columns "A'" and "B'" corresponding to variables "A" and "B".

Generation module 250 automatically generates SQL statement 230 for table creation as described above. Preferably, generation module 250 also outputs a mapping table 232 as a result of association, in addition to SQL statement 230.

Mapping table 232 indicates a result of association among a data type of a variable, an identification name on database 430, and a data type on database 430 as to each collection target variable. Preferably, mapping table 232 also includes a flag indicating which column is set as a primary key, and a flag indicating whether NULL designation for each column is inhibited. Outputting such mapping table 232 causes the user to easily grasp an associated column name of each collection target variable, a data type of each collection target variable, and the like.

SQL statement 230 thus generated is transmitted to external apparatus 400. With reference to FIG. 16 again, in step S44, external apparatus 400 creates table 432 in accordance with SQL statement 230, based on reception of SQL statement 230 from controller 200. As a result, empty table 432 illustrated in FIG. 6 is created on database 430.

In step S50, controller 200 determines whether to accept an instruction to execute command value generation processing specified in user program 210. When controller 200 determines that controller 200 accepts this execution instruction (YES in step S50), controller 200 generates a command value in accordance with the specified instruction, and sends the command value to drive apparatus 300 (step S52). Drive apparatus 300 drives a control target in accordance with the command value received from controller 200. When controller 200 does not determine that controller 200 accepts the instruction to execute the command value generation processing (NO in step S50), controller 200 switches the control to step S60 without executing the processing in step S52.

In step S60, controller 200 determines whether to accept an instruction to execute collection target variable upload processing. When controller 200 determines that controller 200 accepts this execution instruction (YES in step S60), controller 200 generates an SQL statement for executing an INSERT instruction. The SQL statement specifies information (e.g., a table name) for designating a table to which data is added, a value of data to be uploaded onto each column, and the like.

In step S62, controller 200 sends the generated SQL statement to external apparatus 400. External apparatus 400 generates a record in which a value of a variable is reflected on each column in accordance with the SQL statement received from controller 200, and adds the generated record to table 432 created in step S44. The collection target variable is thus reflected on table 432. Thereafter, external apparatus 400 transmits, to controller 200, a result of the upload indicating normal termination or abnormal termination.

When controller 200 does not accept the instruction to execute the collection target variable upload processing (NO in step S60), controller 200 switches the processing to step S70 without executing the processing in step S62.

In step S70, controller 200 determines whether to terminate the execution of user program 210. This termination instruction is issued based on, for example, acceptance of a terminating manipulation from the user. When controller 200 determines that controller 200 accepts the terminating manipulation from the user (YES in step S70), controller 200 terminates the execution of user program 210. When controller 200 does not accept the terminating manipulation from the user (NO in step S70), controller 200 returns the control to step S40.

In the foregoing exemplary description, controller 200 transmits the SQL statement including the INSERT instruction to database 430 of external apparatus 400 in step S62. Alternatively, only the value to be subjected to INSERT processing may be sent to database 430 of external apparatus 400. In this case, external apparatus 400 generates the SQL statement including the INSERT instruction, based on reception of the value to be subjected to INSERT processing, and executes the INSERT processing for the received value, based on the SQL statement.

<J. Table Creating FB>

As described above, development support device 100 provides, as generation module 250, the function of generating SQL statement 230 for table creation. Generation module 250 is provided in the form of, for example, a function block black (FB).

Figure 18:
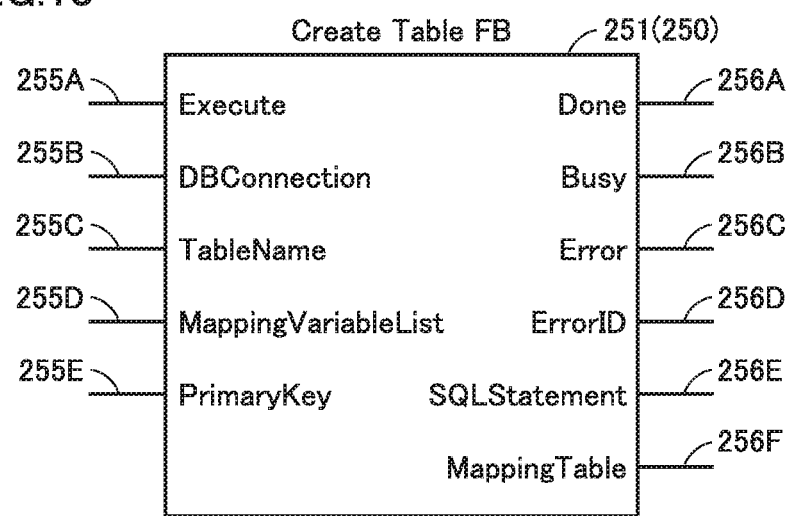
FIG. 18 is a diagram that illustrates a table creating FB as an exemplary generation module according to the second embodiment.

With reference to FIG. 18, a description will be given of generation module 250 provided as a function block. FIG. 18 is a diagram that illustrates a table creating FB 251 as an exemplary generation module 250.

It should be noted that generation module 250 may be specified with any form in addition to the function block. For example, generation module 250 may be specified with a ladder diagram. Generation module 250 may also be specified with one of or a combination of an instruction list, a structured text, and a sequential function chart. In addition, generation module 250 may be specified with general-purpose programming language such as JavaScript or C language.

Table creating FB 251 includes input units 255A to 255E each configured to accept a setting regarding generation of an SQL statement 230, and output units 256A to 256F each configured to output a generation result of SQL statement 230.

Input unit 255A represented by "Execute" accepts a setting for designating whether to execute SQL statement generation processing. For example, input unit 255A is specified to accept input of the "BOOL" type. As long as "FALSE" is input to input unit 255A, the SQL statement generation processing is not executed. When "TRUE" is input to input unit 255A, the SQL statement generation processing is executed.

Input unit 255B represented by "DBConnection" accepts a connection result obtained by execution of a function block for connection to database 430. This connection result includes information (e.g., a database name) for accessing database 430.

Input unit 255C represented by "TableName" accepts a setting of a table name. Input unit 255E is specified to accept, for example, a "DWORD" type variable.

Input unit 255D represented by "MappingVariableList" accepts input of a collection target variable. Input unit 255D is specified to accept a predefined structural body. Input unit 255D receives collection target variables 229 (see FIG. 17).

Input unit 255E represented by "PrimaryKey" accepts an input for setting a primary key. Input unit 255E is specified to accept, for example, a "String" type variable. As described above, table creating FB 251 is specified to accept an input for designating any of the collection target variables as a primary key.

When SQL statement 230 is generated normally, output unit 256A represented by "Done" outputs a signal indicating normal termination. During the generation of SQL statement 230, output unit 256B represented by "Busy" outputs a signal indicating that this generation processing is in progress. When SQL statement 230 is not generated normally, output unit 256C represented by "Error" outputs a signal indicating abnormal termination. In this case, output unit 256D represented by "ErrorID" outputs an error ID for identifying details of an error. Output unit 256E represented by "SQLStatement" outputs SQL statement 230 (see FIG. 17) generated by execution of table creating FB 251. Output unit 256F represented by "MappingTable" outputs mapping table 232 (see FIG. 17) created by execution of table creating FB 251.

<K. Modification of Table Creating Pattern>

Figure 19:
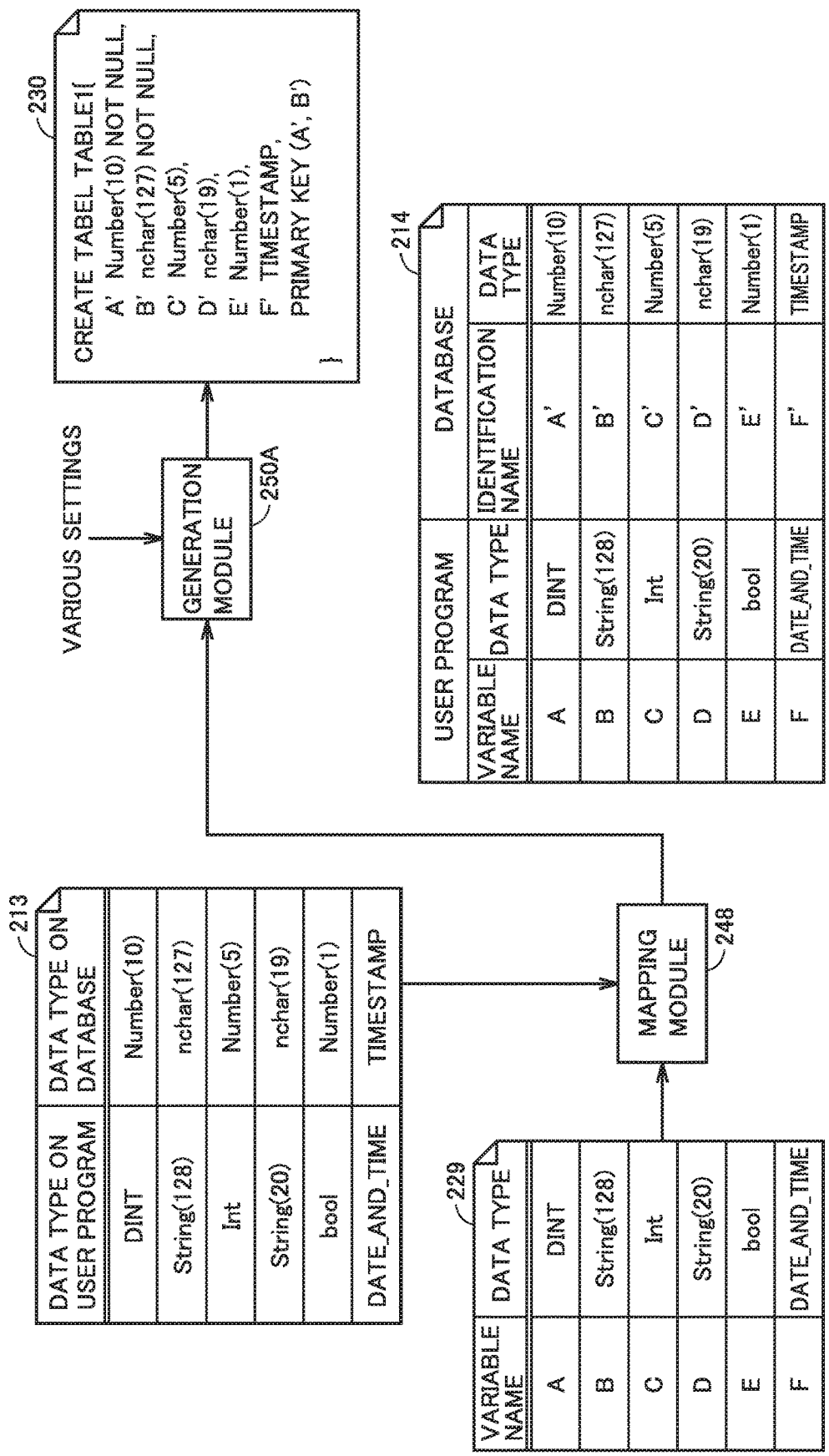
FIG. 19 is a diagram that schematically illustrates processing of generating an SQL statement in a modification.

With reference to FIG. 19, a description will be given of a modification of a creating pattern for an SQL statement 230. FIG. 19 is a diagram that schematically illustrates processing of generating SQL statement 230 in the modification.

In the example illustrated in FIG. 17, generation module 250 generates SQL statement 230 for table creation and mapping table 232, based on input of correspondences 213 and collection target variables 229. In contrast to this, in the creating pattern according to the modification, a generation module 250A outputs an SQL statement 230, based on input of a mapping table 232 generated by a mapping module 248.

The remaining respects are equal to those described above; therefore, the repeated description thereof will not be given below.

Mapping module 248 is a program module to be incorporated in user program 210. Mapping module 248 creates a mapping table 214, based on input of correspondences 213 and collection target variables 229.

More specifically, mapping module 248 determines an identification name of each collection target variable on database 430. It is assumed that mapping module 248 determines that identification names of variables "A" to "F" on database 430 are column names "A'" to "F'". In an aspect, mapping module 248 determines, as an identification name on database 430, a name identical to a variable name of each collection target variable. In this case, column names "A'" to "F'" are respectively equal to variable names "A" to "F". In another aspect, mapping module 248 determines, as the identification name on database 430, a name including a variable name of each collection target variable. In this case, variable names "A" to "F" to which predetermined keywords are respectively added respectively correspond to column names "A'" to "F'".

Based on correspondences 213, next, mapping module 248 identifies a data type of each collection target variable on database 430, the data type corresponding to the data type of the variable.

Next, mapping module 248 outputs correspondences among variable names "A" to "F", the data types of variables "A" to "F", the identification names of variables "A" to "F" on the database, and the data types of variable names "A" to "F" on the database, as mapping table 214 to generation module 250A.

Generation module 250A generates SQL statement 230, based on an identification name on the database, the identification name being specified in mapping table 232, and a data type on the database, the data type corresponding to the identification name. The method of generating SQL statement 230 by generation module 250A is equal to that described above; therefore, the repeated description thereof will not be given below.

<L. Mapping FB>

Figure 20:
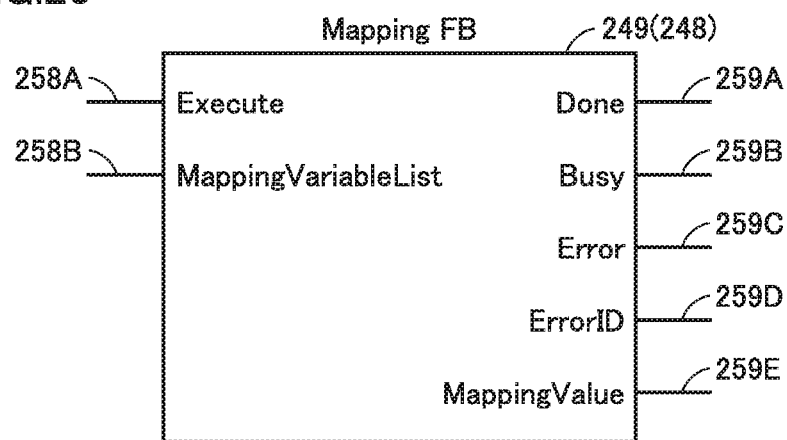
FIG. 20 is a diagram that illustrates a mapping FB as an exemplary mapping module according to the second embodiment.

Mapping module 248 illustrated in FIG. 19 is provided in the form of, for example, a function block (FB). With reference to FIG. 20, hereinafter, a description will be given of mapping module 248 provided as a function block. FIG. 20 is a diagram that illustrates mapping FB 249 as an exemplary mapping module 248.

It should be noted that mapping module 248 may be specified with any form in addition to the function block. For example, mapping module 248 may be specified with a ladder diagram. Mapping module 248 may also be specified with one of or a combination of an instruction list, a structured text, and a sequential function chart. In addition, mapping module 248 may be specified with general-purpose programming language such as JavaScript or C language.

Mapping FB 249 includes input units 258A and 258B each configured to accept a setting regarding creation of a mapping table 214, and output units 259A to 259E each configured to output a creation result of mapping table 214.

Input unit 258A represented by "Excute" accepts a setting for designating whether to execute processing of creating mapping table 214. For example, input unit 258A is specified to accept input of the "BOOL" type". As long as "FALSE" is input to input unit 258A, the processing of creating mapping table 214 is not executed. When "TRUE" is input to input unit 258A, the processing of creating mapping table 214 is executed.

Input unit 258B represented by "MappingVariableList" accepts input of a collection target variable. Input unit 258B is specified to accept a predefined structural body. Input unit 258B receives a collection target variable 229 (see FIG. 19) defined as a structural body.

When mapping table 214 is created normally, output unit 259A represented by "Done" outputs a signal indicating normal termination. During the creation of mapping table 214, output unit 259B represented by "Busy" outputs a signal indicating that this creation processing is in progress. When mapping table 214 is not created normally, output unit 259C represented by "Error" outputs a signal indicating abnormal termination. In this case, output unit 259D represented by "ErrorID" outputs an error ID for identifying details of an error. Output unit 259E represented by "MappingTable" outputs a mapping table 232 (see FIG. 19) created by execution of mapping FB 249.

<M. Modification of Table Creating FB>

Figure 21:
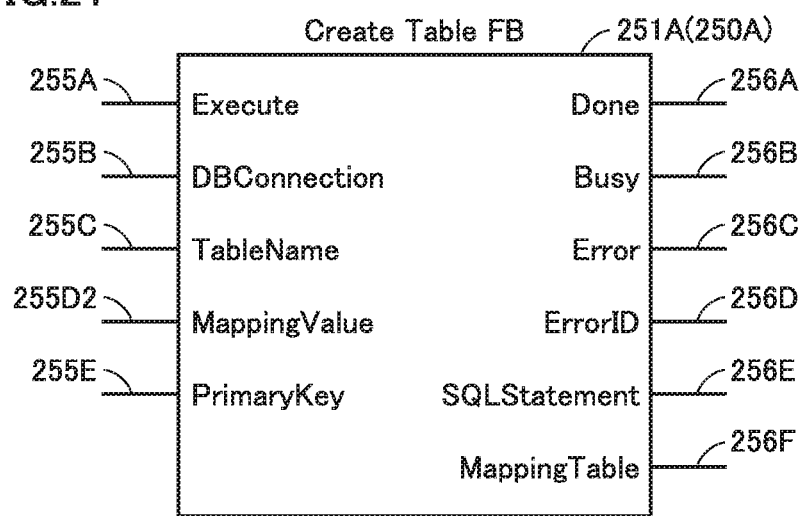
FIG. 21 is a diagram that illustrates a table creating FB as an exemplary generation module according to the second embodiment.

Generation module 250A illustrated in FIG. 19 is provided in the form of, for example, a function block (FB). With reference to FIG. 21, hereinafter, a description will be given of generation module 250A provided as a function block. FIG. 21 is a diagram that illustrates a table creating FB 251A as an exemplary generation module 250A.

Table creating FB 251A includes input units 255A to 255C, 255D2, and 255E each configured to accept a setting regarding generation of an SQL statement 230, and output units 256A to 256F each configured to output a generation result of SQL statement 230. Configurations excluding a configuration of input unit 255D2 are equal to those in table creating FB 251 illustrated in FIG. 18; therefore, the repeated description of the configurations excluding the configuration of input unit 255D2 will not be given below.

Input unit 255D2 represented by "MappingValue" accepts input of a mapping table 232 to be created by mapping FB 249 (see FIG. 20).

Table creating FB 251A generates SQL statement 230 in accordance with information input to each of input units 255A to 255C, 255D2, and 255E. The method of generating SQL statement 230 by table creating FB 251A is equal to that described with reference to FIG. 19; therefore, the repeated description thereof will not be given below.

<N. Creating Pattern by Generation Module 250>

Collection target variables may include a structural body. In a case where collection target variables include a structural body, generation module 250 generates an SQL statement 230 for table creation in a manner different from that in a case where collection target variables include no structural body. For example, two creating patterns (creating patterns 3 and 4) are considered as processing of creating a table 432 in the case where collection target variables include a structural body.

In creating pattern 3, generation module 250 separately creates a table for managing a variable different from a structural body and a table for managing a member variable included in a structural body. In creating pattern 4, generation module 250 creates one table for collectively managing a variable different from a structural body and a member variable included in a structural body.

Figure 22:
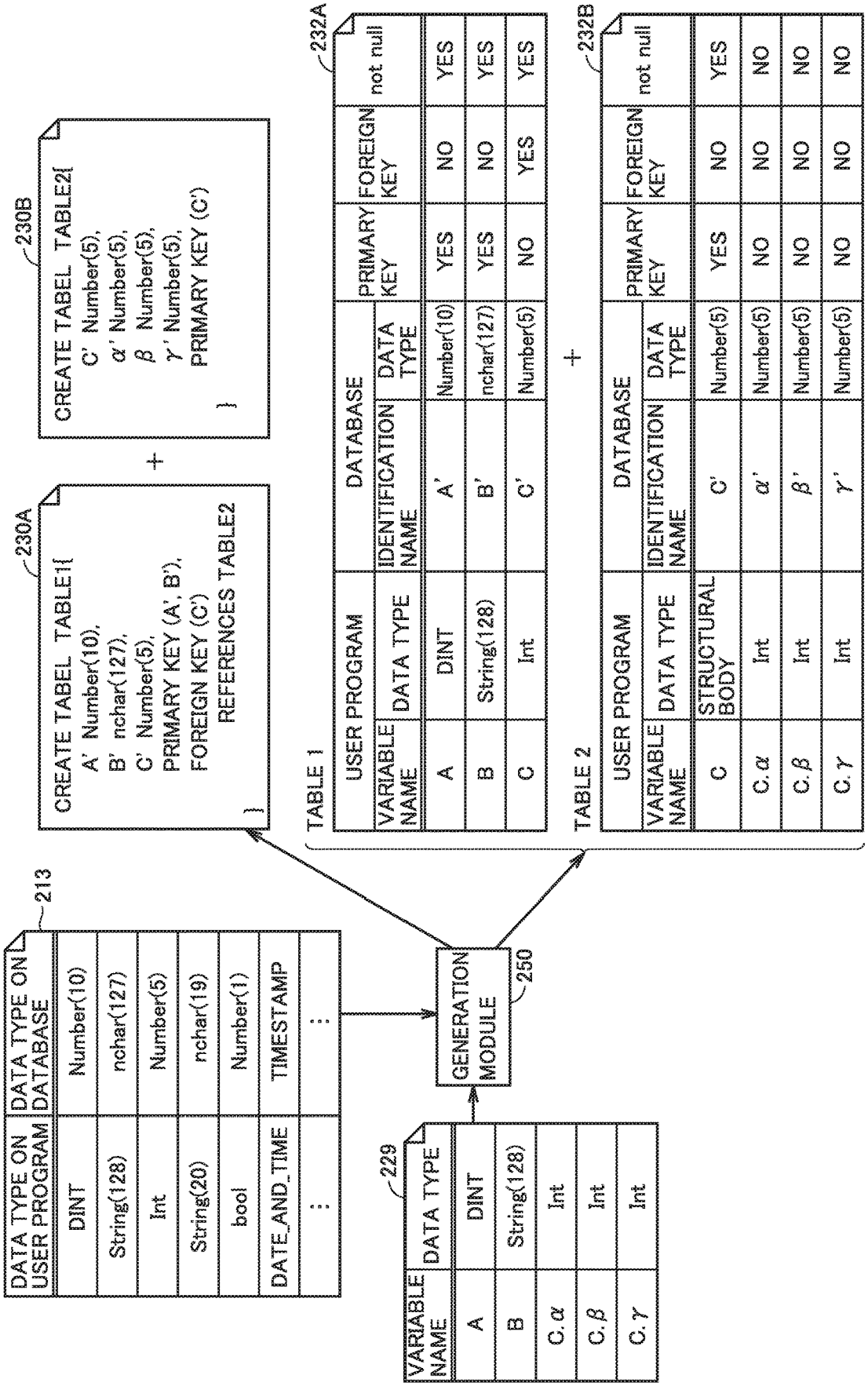
FIG. 22 is a diagram that schematically illustrates a creating pattern 3 in the second embodiment.
Figure 23:
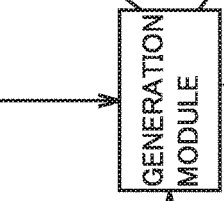
FIG. 23 is a diagram that schematically illustrates a creating pattern 4 in the second embodiment.

With reference to FIGS. 22 and 23, hereinafter, a description will be given of creating patterns 3 and 4 according to the second embodiment in sequence.

(M1. Table Creating Pattern 3)

First, a description will be given of creating pattern 3 according to the second embodiment. FIG. 22 is a diagram that schematically illustrates table creating pattern 3 according to the second embodiment.

Generation module 250 generates an SQL statement 230A for creating "TABLE1" and an SQL statement 230B for creating "TABLE2", based on the input of data type correspondences 213 and collection target variables 229.

More specifically, generation module 250 determines an identification name of each collection target variable on database 430. At this time, in the case where the collection target variables include a structural body, generation module 250 determines an identification name on database 430 as to a structural body name, and also determines an identification name of each member of the structural body, on database 430. It is assumed as a result that generation module 250 determines that identification names of collection target variables "A" and "B" on database 430 are column names "A'" and "B'". It is also assumed that generation module 250 determines that an identification name of structural body "C" on database 430 is column "C'". It is also assumed that generation module 250 determines that identification names of member variables "α" to "γ" of collection target structural body "C" on database 430 are column names "α'" to "γ'".

Based on correspondences 213, next, generation module 250 identifies a data type of each collection target variable on database 430, the data type corresponding to the data type of the variable.

Next, generation module 250 generates SQL statement 230, based on the determined identification name of each collection target variable and the identified data type of each collection target variable on database 430. At this time, generation module 250 generates an SQL statement 230A so as to register, in table "TABLE1", identification names "A'" and "B'" determined as the collection target variable names and identification name "C'" determined as the structural body name. In addition, generation module 250 generates an SQL statement 230B so as to register determined identification names "α'" to "γ'" of the respective member variables of the structural body, in table "TABLE2" different from table "TABLE1".

More specifically, generation module 250 reflects a description of "A' Number(10)" on SQL statement 230A, based on determined identification name "A'" of variable "A" and data type "Number(10)" on the database, data type "Number(10)" corresponding to variable "A". With this description, the column with identification name "A'" is added to the table. Likewise, generation module 250 reflects, on SQL statement 230A, descriptions for addition of the columns with identification names "B'" and "C'".

In addition, generation module 250 adds, to SQL statement 230A, an instruction code for registering column name "C'" determined as the structural body name, as a foreign key in table "TABLE2". In the example illustrated in FIG. 22, a description of "FOREIGN KEY (C') REFERENCES TABLE2" is added to SQL statement 230A. With this description, column "C'" is specified as a foreign key for referencing to "TABLE2".

As to member variables "α", "β", and "γ" included in structural body "C", next, generation module 250 reflects descriptions for addition of columns "C", "α", "β", and "γ" on SQL statement 230B different from SQL statement 230A. In the example illustrated in FIG. 22, a description of "C' Number(5)", a description of "α' Number(5)", a description of "β' Number(5)", and a description of "γ' Number(5)" are reflected on SQL statement 230B. With these descriptions, the columns with identification names "C'", "α'", "β'", and "γ'" are added to the different table. At this time, as to column name "C'" given to structural body name "C", a description of "PRIMARY KEY (C')" is added to SQL statement 230B. With this description, the column with identification name "C'" is set as a primary key.

Generation module 250 automatically generates SQL statements 230A and 230B for table creation as described above. In the foregoing exemplary description, as illustrated in FIG. 22, the collection target variables include one structural body. Alternatively, in a case where collection target variables include a plurality of structural bodies, an SQL statement is generated such that tables are created in accordance with the number of structural bodies. In a case where members of a structural body include a structural body, an SQL statement is generated such that a table is created for each structural body.

Preferably, generation module 250 also outputs mapping tables 232A and 232B as a result of association, in addition to SQL statements 230A and 230B.

Mapping table 232A is created as a generation result of SQL statement 230A. Mapping table 232A indicates a result of association among a variable name corresponding to a column specified in SQL statement 230A, a data type of the variable, an identification name of the column, and a data type of the column. In addition, each collection target variable specified in mapping table 232A is associated with a flag indicating whether the collection target variable is a primary key, and a flag indicating whether NULL designation is inhibited.

Mapping table 232B is created as a generation result of SQL statement 230B. Mapping table 232B indicates a result of association among a variable name corresponding to a column specified in SQL statement 230B, a data type of the variable, an identification name of the column, and a data type of the column. In addition, each collection target variable specified in mapping table 232B is associated with a flag indicating whether the collection target variable is a primary key, and a flag indicating whether NULL designation is inhibited.

Outputting mapping tables 232A and 232B causes the user to easily grasp an associated column name of each collection target variable, a data type on the database, the data type corresponding to a data type of each collection target variable, and the like.

(M2. Table Creating Pattern 4)

With reference to FIG. 23, next, a description will be given of creating pattern 4 of table 432 in a case where collection target variables include a structural body. FIG. 23 is a diagram that schematically illustrates table creating pattern 4 according to the second embodiment.

It is assumed that structural body "C" in collection target variables 229 is designated as a collection target variable. Structural body "C" includes variables "α", "β", and "γ" as a member variable. In this creation example, generation module 250 creates one table including, as elements, a variable different from a structural body and a member variable included in a structural body.

More specifically, generation module 250 determines an identification name of each collection target variable on database 430. At this time, in the case where the collection target variables include a structural body, generation module 250 determines an identification name on database 430 as to each variable different from the structural body and each member variable included in the structural body. It is assumed as a result that generation module 250 determines that identification names of collection target variables "A" and "B" on database 430 are column names "A'" and "B'". It is also assumed that generation module 250 determines that identification names of member variables "α" to "γ" of collection target structural body "C" on database 430 are column names "α'" to "γ'".

Based on correspondences 213, next, generation module 250 identifies a corresponding data type on database 430 as to each variable different from the structural body and each member variable included in the structural body.

Next, generation module 250 generates SQL statement 230, based on the determined identification name of each collection target variable and the identified data type of each collection target variable on database 430. At this time, generation module 250 generates an SQL statement 230A so as to register, in table "TABLE1", determined identification names "A'", "B'" and "α'" to "γ'" as the collection target variable names.

More specifically, generation module 250 reflects a description of "A' Number(10)" on SQL statement 230A, based on determined identification name "A'" of variable "A" and data type "Number(10)" on the database, data type "Number(10)" corresponding to variable "A". With this description, the column with identification name "A'" is added to the table. Likewise, generation module 250 reflects, on SQL statement 230A, descriptions for addition of the columns with identification names "B'" and "α'" to "γ'".

Generation module 250 automatically generates SQL statement 230 for table creation as described above. Preferably, generation module 250 also outputs a mapping table 232 as a result of association, in addition to SQL statement 230.

Mapping table 232 is created as a generation result of SQL statement 230. Mapping table 232 indicates a result of association among a variable name corresponding to a column specified in SQL statement 230, a data type of the variable, an identification name of the column, and a data type of the column. In addition, each collection target variable specified in mapping table 232 is associated with a flag indicating whether the collection target variable is a primary key, and a flag indicating whether NULL designation is inhibited.

Outputting mapping table 232 causes the user to easily grasp an associated column name of each collection target variable, a data type on the database, the data type corresponding to a data type of each collection target variable, and the like.

<O. Advantage>

Figure 24:
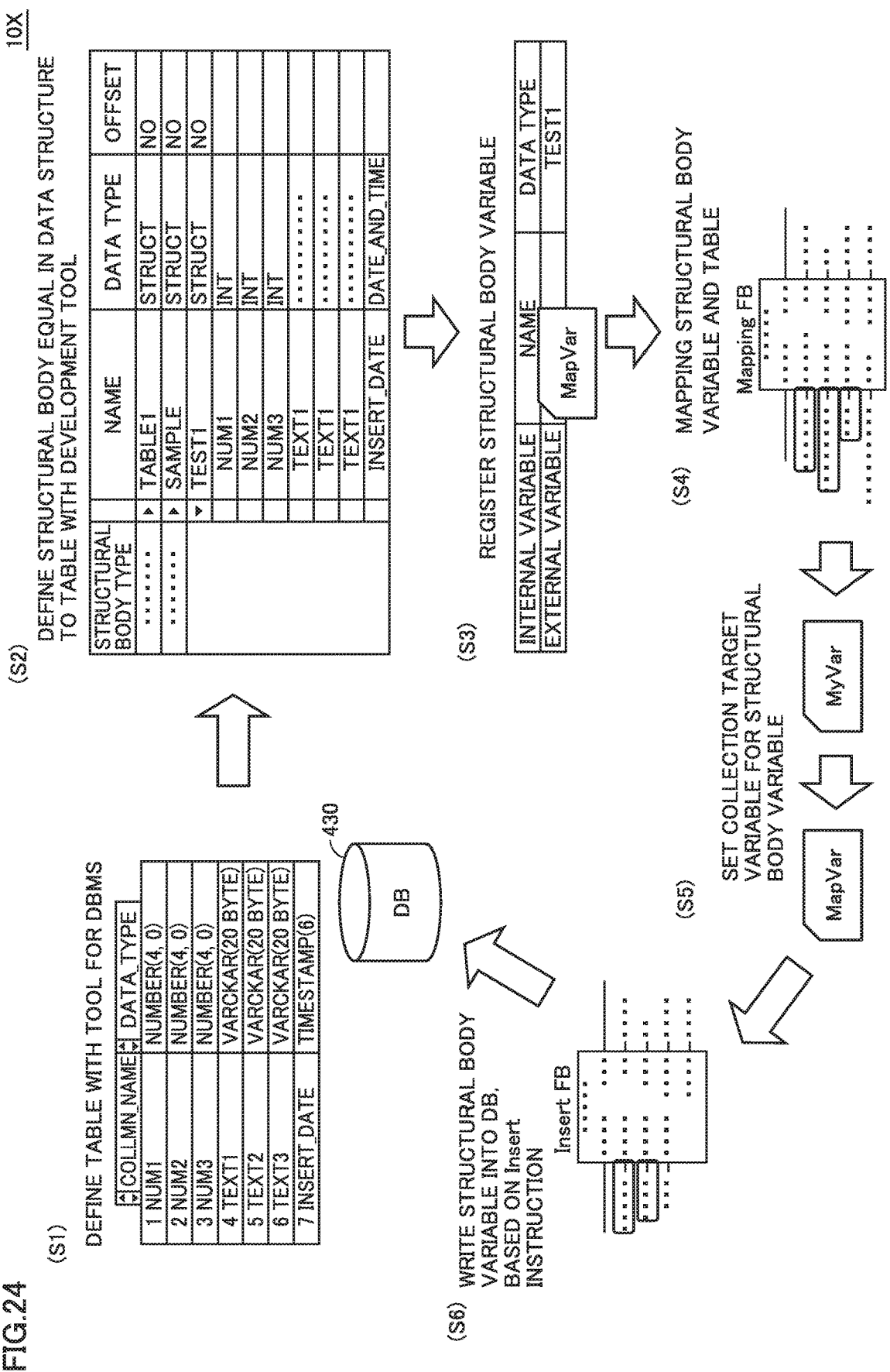
FIG. 24 is a diagram that illustrates a processing flow for table creation by a control system according to a comparative example.

With reference to FIGS. 24 and 25, a description will be given of an advantage of control system 10 according to the second embodiment, based on a comparison with a control system 10X according to a comparative example. FIG. 24 is a diagram that illustrates a processing flow for table creation by control system 10X according to the comparative example. FIG. 25 is a diagram that illustrates a processing flow for table creation by control system 10 according to the second embodiment.

Control system 10X according to the comparative example is not equipped with generation module 250 for automatically creating a table. In order to register a table in control system 10X and to upload collection target data onto the table, a user needs to perform the following manipulations in steps S1 to S6.

Step S1 involves formulating an SQL statement for table creation on an external apparatus 400, and previously registering a table on a database 430.

Step S2 involves defining a structural body variable on a development tool 30 of a development support device 100, in accordance with a data structure of the table registered in database 430 in step S1.

Step S3 involves registering the structural body variable defined in step S2 in development support device 100.

Step S4 involves specifying, on a user program 210, a correspondence between each member of the structural body variable defined in step S2 and each column of the table registered in database 430 in step S1.

Step S5 involves designing user program 210 so as to set, as a collection target variable, the structural body variable registered in step S3.

Step S6 involves designing user program 210 so as to upload, onto database 430, the structural body variable set as the collection target variable in step S5.

In contrast to this, in control system 10 according to the present embodiment, a table is automatically created on database 430 when user program 210 is designed to input a collection target variable to generation module 250. Therefore, control system 10 according to the present embodiment has no necessity of the manipulations in steps S1, S2, S3, and S5 as illustrated in FIG. 25. As a result, control system 10 according to the present embodiment facilitates manipulations for database 430, and causes a user having no expertise to design database 430.

<P. Summary of Second Embodiment>

As described above, development support device 100 provides, as generation module 250, the function of automatically creating a table. Generation module 250 determines an identification name of each collection target variable on database 430. In addition, generation module 250 identifies a data type, on database 430, of each collection target variable included in user program 210, the data type corresponding to the data type of the variable, based on predetermined correspondence 213 between a data type that may be utilized in user program 210 and a data type that may be utilized in database 430. Next, generation module 250 generates an SQL statement for table creation, based on the determined identification name of each collection target variable on database 430 and the identified data type of each collection target variable on database 430.

As described above, the user does not need to formulate SQL statement 230 in creating a table on database 430. It is therefore possible for even a user having no knowledge of SQL to easily construct database 430.

<Q. Supplementary Note>

As described above, the present embodiment involves the following disclosure.

[Configuration 1]

A controller (200) for controlling a control target,
the controller including:
a communication unit (201) configured to access a database (430); and
a storage device (208) configured to store a control program for controlling the control target, wherein
the control program includes a generation module (250) configured to output an SQL statement (230) for creating, on the database (430), a table (432) in which collection target variables included in the control program are stored,
the generation module (250) determines an identification name, on the database (430), of each collection target variable,
based on a predetermined correspondence (213) between a data type usable in the control program and a data type usable in the database (430), the generation module (250) identifies a data type, on the database (430), of each collection target variable, the data type corresponding to the data type of the variable in the control program, and the generation module (250) generates the SQL statement (230), based on the determined identification name of each collection target variable and the identified data type of each collection target variable.

[Configuration 2]

The controller according to Configuration 1, wherein the controller (200) further outputs a result of association among each collection target variable, a data type of the variable, an identification name of the variable on the database (430), and a data type of the variable on the database (430).

[Configuration 3]

The controller according to Configuration 1 or 2, wherein the generation module (250) determines a name identical to a variable name of each collection target variable or a name including a variable name of each collection target variable, as the identification name on the database (430).

[Configuration 4]

The controller according to any one of Configurations 1 to 3, wherein when the collection target variables include a structural body, the generation module (250) determines the identification name as a structural body name, and determines the identification name of each member of the structural body, the generation module (250) generates the SQL statement (230) so as to register the determined identification name as the structural body name in the table (432), and the generation module (250) generates the SQL statement (230) so as to register the determined identification name of each member of the structural body in a table (432) different from the table (432) in which collection target variables are stored.

[Configuration 5]

The controller according to Configuration 4, wherein the SQL statement (230) includes an instruction statement for registering the determined identification name as the structural body name, as a foreign key in the table (432).

[Configuration 6]

The controller according to any one of Configurations 1 to 5, wherein the generation module (250) is specified to accept input for designating any of the collection target variables as a primary key, and the SQL statement (230) includes an instruction statement for registering an identification name corresponding to a designated one of the variables as a primary key in the table (432).

[Configuration 7]

A control method for a controller (200) configured to access a database (430), the control method including:

receiving a control program for the controller (200);

determining an identification name, on the database (430), of each collection target variable included in the control program;

based on a predetermined correspondence (213) between a data type usable in the control program and a data type usable in the database (430), identifying a data type, on the database (430), of each collection target variable, the data type corresponding to the data type of the variable in the control program; and outputting an SQL statement (230) for creating, on the database (430), a table (432) in which the collection target variables are stored, based on the determined identification name of each collection target variable and the identified data type of each collection target variable.

[Configuration 8]

A control program for a controller (200) configured to access a database (430), the control program causing the controller (200) to execute:

determining an identification name, on the database (430), of each collection target variable included in the control program;

based on a predetermined correspondence (213) between a data type usable in the control program and a data type usable in the database (430), identifying a data type, on the database (430), of each collection target variable, the data type corresponding to the data type of the variable in the control program; and outputting an SQL statement (230) for creating, on the database (430), a table (432) in which the collection target variables are stored, based on the determined identification name of each collection target variable and the identified data type of each collection target variable.

It should be understood that the embodiments disclosed herein are in all aspects illustrative and not restrictive. The scope of the present invention is defined by the appended claims rather than the foregoing description, and all changes that fall within metes and bounds of the claims, or equivalence such metes and bounds thereof are therefore intended to be embraced by the claims.

REFERENCE SIGNS LIST 10, 10X: control system, 30: development tool, 31: program designing screen, 33: table setting screen, 35, 36, 41, 45, 46, 50, 51: setting field, 42: display field, 35A, 41A, 42A, 46A, 50A, 51A: button, 58: table creation button, 59: cancel button, 100: development support device, 102, 202, 402: control device, 104, 206, 404: main memory, 110, 208, 410: storage device, 110A: development support program, 111, 201, 412: communication interface, 114, 414: I/O interface, 115, 415: manipulation unit, 120, 420: display interface, 121, 421: display unit, 125, 425: internal bus, 200: controller, 204: chipset, 209: system program, 210: user program, 210A: sequence program, 210B: motion program, 211: control program, 212: setting information, 213: correspondence, 214, 232, 232A, 232B: mapping table, 222: internal bus controller, 224: field bus controller, 226: I/O unit, 229: collection target variable, 230, 230A, 230B: SQL statement, 239: memory card interface, 240: memory card, 248: mapping module, 249: mapping FB, 250, 250A: generation module, 251, 251A: table creating FB, 252: program execution module, 255A, 255B, 255C, 255D, 255D2, 255E, 258A, 258B: input unit, 256A, 256B, 256C, 256D, 256E, 256F, 259A, 259B, 259C, 259D, 259E: output unit, 300: drive apparatus, 300A: robot controller, 300B: servo driver, 301A: arm robot, 301B: servo motor, 400: external apparatus, 416: field bus interface, 430: database, 432, 432A, 432B: table

The invention claimed is:

1. A controller for controlling a drive apparatus which drives a control target included in a factory automation system in accordance with a command value, the controller comprising:

a communication unit configured to access a database; and a storage device configured to store a control program, wherein the control program includes a control module configured to generate the command value, and a generation module configured to output an SQL statement which creates, in the database, a table in which collection target variables included in the control program are stored, the generation module determines an identification name, in the database, of each collection target variable, based on a predetermined correspondence between a data type usable in the control program and a data type usable in the database, the generation module identifies a data type, in the database, of each collection target variable, the data type corresponding to the data type of the variable in the control program, the generation module generates the SQL statement, based on the determined identification name of each collection target variable and the identified data type of each collection target variable, and the generation module outputs, based on the generated SQL statement, a mapping table indicating, for each of the collection target variables, an association between the data type usable in the control program and the data type usable in the database, and between an identification name in the control program and the identification name in the database.

2. The controller according to claim 1, wherein the controller further outputs a result of association among each collection target variable, a data type of the variable in the control program, the identification name of the variable in the database, and the data type of the variable in the database.

3. The controller according to claim 1, wherein the generation module determines a name identical to a variable name of each collection target variable or a name including a variable name of each collection target variable, as the identification name in the database.

4. The controller according to claim 1, wherein
when the collection target variables include a structural body, the generation module determines the identification name as a structural body name, and determines the identification name of each member of the structural body,
the generation module generates the SQL statement so as to register the determined identification name as the structural body name in the table, and
the generation module generates the SQL statement so as to register the determined identification name of each member of the structural body, in a table different from the table in which collection target variables are stored.

5. The controller according to claim 4, wherein the SQL statement includes an instruction statement registering the determined identification name as the structural body name, as a foreign key in the table.

6. The controller according to claim 1, wherein
the generation module is specified to accept input designating any of the collection target variables as a primary key, and
the SQL statement includes an instruction statement registering an identification name corresponding to a designated one of the variables as a primary key in the table.

7. The controller according to claim 1, wherein
the control module comprises a function block,
the collection target variables comprise a variable associated with the function block, and
data indicated by the variable associated with the function block includes data representing a state of the drive apparatus.

8. A control method for a controller configured to control a drive apparatus driving a control target comprised in a factory automation system in accordance with a command value, and to access a database, the control method comprising:
receiving a control program configured to generate the command value;
determining an identification name, in the database, of each collection target variable included in the control program;
based on a predetermined correspondence between a data type usable in the control program and a data type usable in the database, identifying a data type, in the database, of each collection target variable, the data type corresponding to the data type of the variable in the control program;
outputting an SQL statement creating, in the database, a table in which the collection target variables are stored, based on the determined identification name of each collection target variable and the identified data type of each collection target variable; and
outputting, based on the SQL statement, a mapping table indicating, for each of the collection target variables, an association between the data type usable in the control program and the data type usable in the database, and between an identification name in the control program and the identification name in the database.

9. The control method according to claim 8, wherein
the control program comprises a function block,
the collection target variables comprise a variable associated with the function block, and
data indicated by the variable associated with the function block includes data representing a state of the drive apparatus.

10. A non-transitory computer-readable storage medium storing a control program for a controller configured control a drive apparatus driving a control target included in a factory automation system in accordance with a command value, and to access a database, the control program causing the controller to execute operations comprising:
generating the command value;
determining an identification name, in the database, of each collection target variable included in the control program;
based on a predetermined correspondence between a data type usable in the control program and a data type usable in the database, identifying a data type, in the database, of each collection target variable, the data type corresponding to the data type of the variable in the control program;
outputting an SQL statement creating, in the database, a table in which the collection target variables are stored, based on the determined identification name of each collection target variable and the identified data type of each collection target variable; and
outputting, based on the SQL statement, a mapping table indicating, for each of the collection target variables, an association between the data type usable in the control program and the data type usable in the database, and between an identification name in the control program and the identification name in the database.

11. The non-transitory computer-readable medium according to claim 10, wherein
the control program comprises a function block,
the collection target variables comprise a variable associated with the function block, and data indicated by the variable associated with the function block includes data representing a state of the drive apparatus.

\* \* \* \* \*